United States Patent
Sunaoshi et al.

(10) Patent No.: US 10,334,130 B2
(45) Date of Patent: Jun. 25, 2019

(54) IMAGE FORMING APPARATUS, IMAGE FORMING SYSTEM, AND POSITION ADJUSTMENT METHOD

(71) Applicants: Masayuki Sunaoshi, Ibaraki (JP); Tomoaki Hayashi, Tokyo (JP); Masahiro Mizuno, Kanagawa (JP); Tsuyoshi Nagasu, Kanagawa (JP)

(72) Inventors: Masayuki Sunaoshi, Ibaraki (JP); Tomoaki Hayashi, Tokyo (JP); Masahiro Mizuno, Kanagawa (JP); Tsuyoshi Nagasu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/921,616

(22) Filed: Mar. 14, 2018

(65) Prior Publication Data

US 2018/0270366 A1    Sep. 20, 2018

(30) Foreign Application Priority Data

Mar. 15, 2017  (JP) ................. 2017-050506
Mar. 12, 2018  (JP) ................. 2018-044808

(51) Int. Cl.
  *G06K 15/00*  (2006.01)
  *H04N 1/00*  (2006.01)

(52) U.S. Cl.
  CPC ....... *H04N 1/0066* (2013.01); *H04N 1/00005* (2013.01)

(58) Field of Classification Search
  CPC ............. H04N 1/0066; H04N 1/00663; H04N 1/00665; H04N 1/00005; H04N 1/00015; H04N 1/00029; H04N 1/00034; H04N 1/00037
  See application file for complete search history.

(56) References Cited

U.S. PATENT DOCUMENTS

| | | |
|---|---|---|
| 2002/0081132 A1 | 6/2002 | Miyamoto et al. |
| 2002/0131804 A1 | 9/2002 | Nakazawa et al. |
| 2003/0039496 A1 | 2/2003 | Miyamoto et al. |

(Continued)

FOREIGN PATENT DOCUMENTS

| | | |
|---|---|---|
| JP | 2002-137509 | 5/2002 |
| JP | 2015-107572 | 6/2015 |

(Continued)

*Primary Examiner* — Moustapha Diaby
(74) *Attorney, Agent, or Firm* — Duft & Bornsen, PC

(57) ABSTRACT

An image forming apparatus includes a conveyor to convey a conveyed object in a conveyance direction, a plurality of head units to perform image formation on the conveyed object, a displacement sensor disposed downstream from the plurality of head units to detect a position adjustment image on the conveyed object, formed by the plurality of head units, and at least one processor configured to adjust an image formation position of at least one of the head units in a direction orthogonal to the conveyance direction, based on a result generated by the displacement sensor. The image forming apparatus further includes a surface sensor to obtain surface data of the conveyed object at a position corresponding to the head unit to be adjusted, and the processor further adjusts the image formation position in the orthogonal direction based on the surface data obtained by the surface sensor.

14 Claims, 21 Drawing Sheets

(56) References Cited

U.S. PATENT DOCUMENTS

| | | |
|---|---|---|
| 2005/0174379 A1 | 8/2005 | Nakazawa et al. |
| 2010/0310284 A1 | 12/2010 | Funato et al. |
| 2012/0321356 A1* | 12/2012 | Sakamoto .......... G03G 15/0131 399/301 |
| 2014/0044460 A1 | 2/2014 | Kudo et al. |
| 2014/0219670 A1 | 8/2014 | Masuda et al. |
| 2014/0268180 A1 | 9/2014 | Takaura et al. |
| 2015/0009262 A1 | 1/2015 | Bell et al. |
| 2015/0290931 A1 | 10/2015 | Boland et al. |
| 2016/0075155 A1 | 3/2016 | Fukui et al. |
| 2016/0075157 A1 | 3/2016 | Morinaga et al. |
| 2016/0114576 A1 | 4/2016 | Tobita |
| 2016/0121602 A1 | 5/2016 | Nagasu et al. |
| 2016/0136947 A1 | 5/2016 | Hommi |
| 2016/0250846 A1* | 9/2016 | Johnson ................ B41J 25/001 347/14 |
| 2016/0288555 A1* | 10/2016 | Ebisawa .................... B41J 2/01 |
| 2016/0347050 A1 | 12/2016 | Hommi |
| 2016/0347052 A1 | 12/2016 | Kawarada et al. |
| 2017/0106647 A1 | 4/2017 | Inoue |
| 2017/0165960 A1 | 6/2017 | Sunaoshi et al. |
| 2017/0165961 A1 | 6/2017 | Hayashi et al. |
| 2017/0182764 A1 | 6/2017 | Nagasu et al. |
| 2017/0187918 A1* | 6/2017 | Fukui ....................... B41J 13/32 |
| 2017/0266954 A1 | 9/2017 | Nagasu et al. |
| 2017/0266965 A1 | 9/2017 | Gohda et al. |
| 2017/0348969 A1 | 12/2017 | Chiba |
| 2017/0355205 A1 | 12/2017 | Tobita et al. |
| 2018/0022088 A1 | 1/2018 | Bando et al. |

FOREIGN PATENT DOCUMENTS

| | | |
|---|---|---|
| JP | 2016-050055 | 4/2016 |
| JP | 2016-055570 | 4/2016 |
| JP | 2016-083936 | 5/2016 |
| JP | 2016-088654 | 5/2016 |

\* cited by examiner

IMAGE FORMING APPARATUS, IMAGE FORMING SYSTEM, AND POSITION ADJUSTMENT METHOD

CROSS-REFERENCE TO RELATED APPLICATIONS

This patent application is based on and claims priority pursuant to 35 U.S.C. § 119(a) to Japanese Patent Application Nos. 2017-050506 filed on Mar. 15, 2017, and 2018-044808 filed on Mar. 12, 2018 in the Japan Patent Office, the entire disclosure of each of which is hereby incorporated by reference herein.

BACKGROUND

Technical Field

This disclosure relates to an image forming apparatus, an image forming system, and a position adjustment method.

Description of the Related Art

There are various types of operation using a head. For example, there are image forming methods that include discharging ink from a print head (so-called inkjet method). To improve the quality of images formed on recording media, such image forming methods include, for example, adjusting the position of the print head relative to the recording media.

For example, to improve image quality, the print head is adjusted based on results of detection by a sensor detecting a position of a recording medium (e.g., a web) conveyed through a print system.

SUMMARY

An embodiment of this disclosure provides an image forming apparatus that includes a conveyor to convey a conveyed object in a conveyance direction, a plurality of head units to perform image formation on the conveyed object, a displacement sensor disposed downstream from the plurality of head units to detect a position adjustment image on the conveyed object, formed by the plurality of head units, and at least one processor configured to adjust an image formation position of at least one of the plurality of head units in an orthogonal direction to the conveyance direction based on a detection result generated by the displacement sensor. The processor is configured to adjust the image formation position to an adjusted position. The image forming apparatus further includes a surface sensor to obtain surface data of the conveyed object at a position corresponding to the at least one of the plurality of head units, and the processor is further configured to adjust the adjusted position in the orthogonal direction based on the surface data obtained by the surface sensor.

According to another embodiment, an image forming system includes a plurality of image forming apparatuses each of which includes the above-described conveyor, the above-described displacement sensor, the above-described processor, and the above-described surface sensor.

Another embodiment provides a method for adjusting a position of image formation on a conveyed object. The method includes detecting a position adjustment image, formed by the plurality of head units, on the conveyed object at a position downstream from the plurality of head units; adjusting, to an adjusted position, an image formation position of at least one of the plurality of head units in an orthogonal direction to a conveyance direction in which the conveyed object is conveyed, based on a result of detection of the position adjustment image; obtaining surface data of the conveyed object at a position corresponding to the at least one of the plurality of head units; and adjusting the adjusted position in the orthogonal direction based on the surface data obtained.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
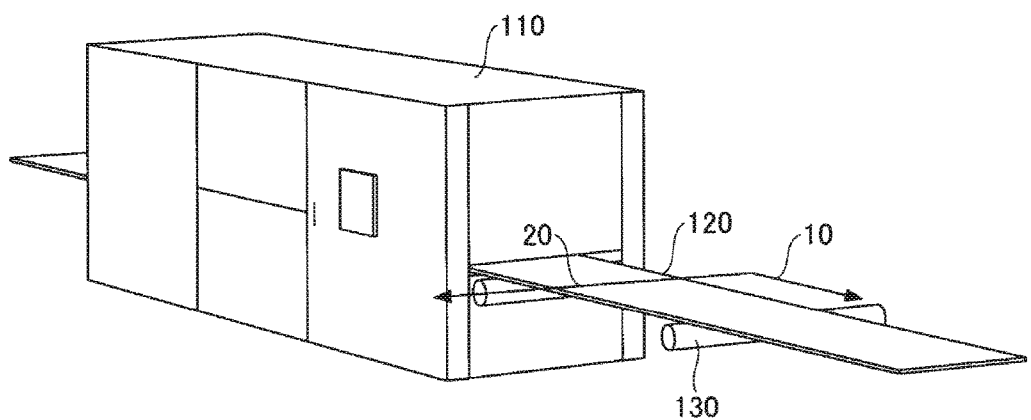
FIG. 1 is a schematic view of a liquid discharge apparatus according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, descriptions are given of an embodiment in which a head of an image forming apparatus is a liquid discharge head unit to discharge liquid.

As used herein, the singular forms "a", "an", and "the" are intended to include the plural forms as well, unless the context clearly indicates otherwise.

The suffixes Y, M, C, and K attached to each reference numeral indicate only that components indicated thereby are used for forming yellow, magenta, cyan, and black images, respectively, and hereinafter may be omitted when color discrimination is not necessary.

General Configuration

FIG. 1 is a schematic view of an example of an image forming apparatus according to an embodiment. For example, the image forming apparatus is a liquid discharge apparatus having a structure illustrated in FIG. 1. The liquid discharge apparatus discharges recording liquid such as aqueous ink or oil-based ink. A liquid discharge apparatus 110 is described below as an example of the image forming apparatus according to the present embodiment.

The liquid discharge apparatus 110 illustrated in FIG. 1 conveys a conveyed object such as a web 120. In the illustrated example, the liquid discharge apparatus 110 includes a roller 130 and the like to convey the web 120, and discharges liquid onto the web 120 to form an image thereon. When an image is formed on the web 120 (i.e., a conveyed object), the web 120 is considered as a recording medium. The web 120 is a so-called continuous sheet. That is, the web 120 is, for example, a rolled sheet to be reeled. The liquid discharge apparatus 110 is a so-called production printer. The description below concerns an example in which the roller 130 adjusts the tension of the web 120 and conveys the web 120 in a conveyance direction 10. Hereinafter, unless otherwise specified, "upstream" and "downstream" mean those in the conveyance direction 10. In the illustrated example, the liquid discharge apparatus 110 is an inkjet printer to discharge four color inks, namely, black (K), cyan (C), magenta (M), and yellow (Y) inks, to form an image on the web 120.

Figure 2:
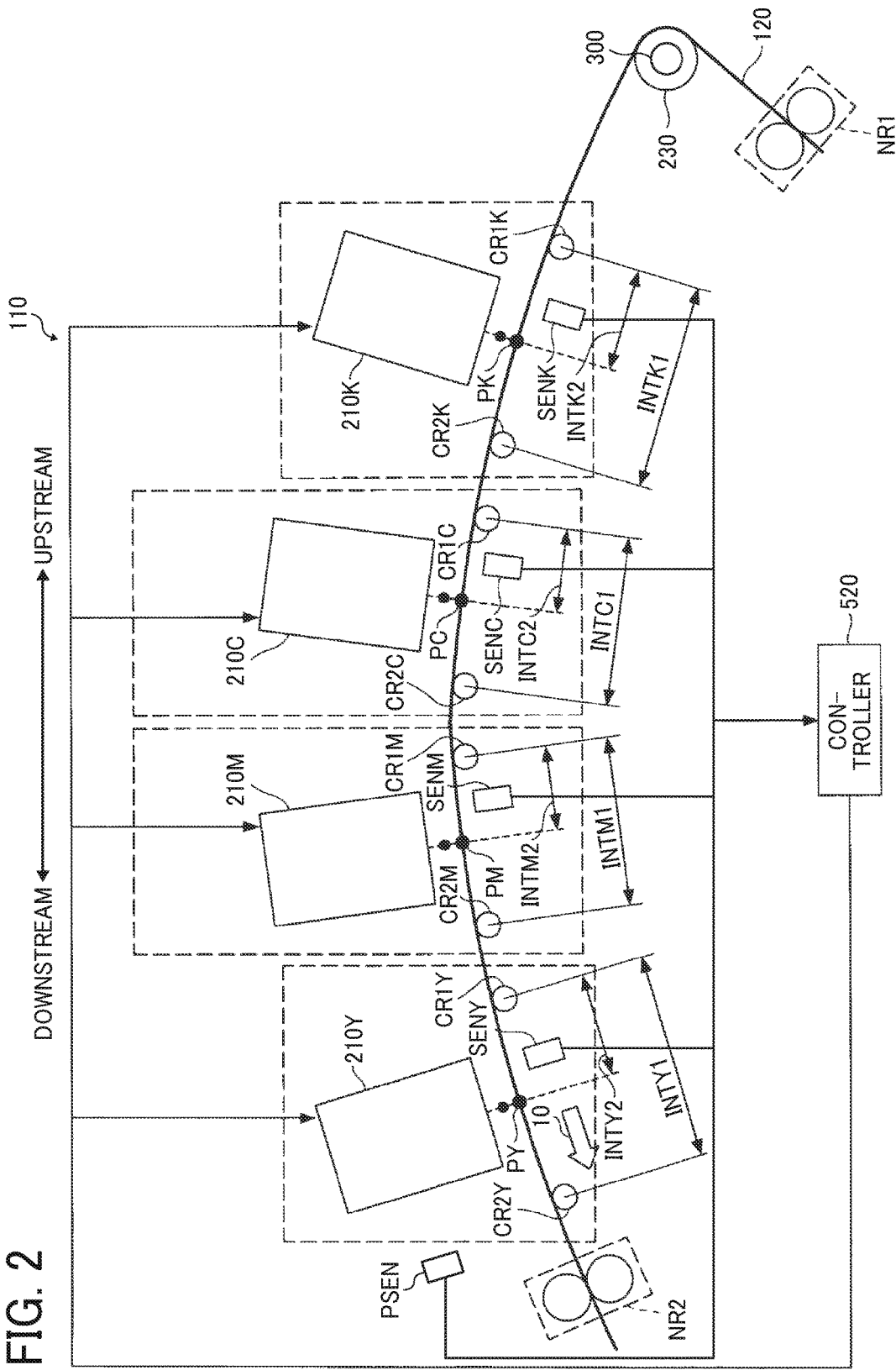
FIG. 2 is a schematic view illustrating a general structure of the liquid discharge apparatus illustrated in FIG. 1.

FIG. 2 is a schematic view illustrating a general structure of the liquid discharge apparatus 110. As illustrated in FIG. 2, the liquid discharge apparatus 110 includes four liquid discharge head units 210 (210Y, 210M, 210C, and 210K) to discharge the four inks, respectively.

As illustrated in FIG. 2, the liquid discharge apparatus 110 includes a displacement sensor PSEN disposed downstream from the extreme downstream liquid discharge head unit 210 in the conveyance direction 10.

Each liquid discharge head unit 210 discharges the ink onto the web 120 conveyed in the conveyance direction 10.

The liquid discharge apparatus 110 includes two pairs of nip rollers, a roller 230, and the like, to convey the web 120. One of the two pairs of nip rollers is a first nip roller pair NR1 disposed upstream from the liquid discharge head units 210 in the conveyance direction 10. The other is a second nip roller pair NR2 disposed downstream from the first nip roller pair NR1 and the liquid discharge head units 210 in the conveyance direction 10. Each nip roller pair rotates while nipping the conveyed object, such as the web 120, as illustrated in FIG. 2. The nip roller pairs and the roller 230 together serve as a conveyor to convey the conveyed object (e.g., the web 120) in a predetermined direction.

The recording medium such as the web 120 is preferably a long sheet. Specifically, the recording medium is preferably longer than the distance between the first nip roller pair NR1 and the second nip roller pair NR2. The recording medium is not limited to webs. For example, the recording medium can be a folded sheet (so-called fanfold paper or Z-fold paper).

In the structure illustrated in FIG. 2, the liquid discharge head units 210 are arranged in the order of black, cyan, magenta, and yellow in the conveyance direction 10. Specifically, the liquid discharge head unit 210K for black is disposed extreme upstream, and the liquid discharge head unit 210C for cyan is disposed next to the liquid discharge head unit 210K. Further, the liquid discharge head unit 210M for magenta is disposed next to the liquid discharge head unit 210C for cyan, and the liquid discharge head unit 210Y for yellow is disposed extreme downstream in the conveyance direction 10.

Each liquid discharge head unit 210 discharges the ink to a predetermined position on the web 120, according to image data. The position at which an image is formed with the ink (hereinafter "landing position") is almost identical to the position at which the ink is discharged from the liquid discharge head unit 210. In other words, the ink landing position is, for example, directly below the liquid discharge head unit 210. In the description below, the position at which an image is formed (i.e., an operation position) by the liquid discharge head unit 210 is the landing position.

In the present embodiment, black ink is discharged to the ink landing position of the liquid discharge head unit 210K (hereinafter "black landing position PK"). Similarly, cyan ink is discharged to the ink landing position of the liquid discharge head unit 210C (hereinafter "cyan landing position PC"). Magenta ink is discharged to the ink landing position of the liquid discharge head unit 210M (hereinafter "magenta landing position PM"). Yellow ink is discharged to the ink landing position of the liquid discharge head unit 210Y (hereinafter "yellow landing position PY"). Note that, for example, a controller 520 operably connected to the liquid discharge head units 210 controls the respective timings of ink discharge of the liquid discharge head units 210 and actuators ACT illustrated in FIG. 8, to move the liquid discharge head units 210. In one embodiment, the timing control and the actuator control is performed by two or more controllers (or control circuits). The actuators ACT are to be described later.

In the illustrated structure, each liquid discharge head unit 210 is provided with a plurality of rollers. As illustrated in the drawings, for example, the liquid discharge apparatus 110 includes the rollers respectively disposed upstream and downstream from each liquid discharge head unit 210. Specifically, each liquid discharge head unit 210 is provided with one roller (i.e., a first roller) to support the web 120, disposed upstream from the ink landing position and another roller (i.e., a second roller) to support the web 120, disposed downstream from the ink landing position, in the conveyance passage along which the web 120 is conveyed. Disposing the first roller and the second roller for each ink landing position can suppress fluttering of the recording medium conveyed. The first roller and the second roller are driven rollers. Alternatively, the first roller and the second roller may be driven by a motor or the like.

Note that, instead of the first and second rollers that are rotators such as driven rollers, first and second supports that are not rotatable to support the conveyed object can be used. For example, each of the first and second supports can be a pipe or a shaft having a round cross section. Alternatively, each of the first and second supports can be a curved plate having an arc-shaped face to contact the conveyed object. In the description below, the first and second supporters are rollers.

Specifically, a first roller CR1K is disposed upstream from the black ink landing position PK in the conveyance direction 10 in which the web 120 is conveyed. A second roller CR2K is disposed downstream from the black ink landing position PK in the conveyance direction 10. Similarly, a first roller CR1C and a second roller CR2C are disposed upstream and downstream from the liquid discharge head unit 210C for cyan, respectively. Similarly, a first roller CR1M and a second roller CR2M are disposed upstream and downstream from the liquid discharge head unit 210M, respectively. Similarly, a first roller CR1Y and a second roller CR2Y are disposed upstream and downstream from the liquid discharge head unit 210Y, respectively.

Figure 14:
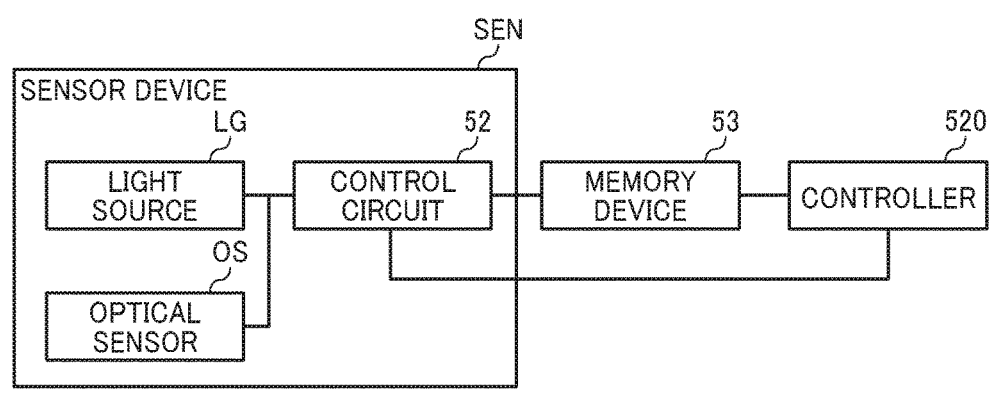
FIG. 14 is a schematic block diagram illustrating a hardware configuration to implement a surface detecting unit according to an embodiment.

As illustrated in FIG. 2, the liquid discharge apparatus 110 includes a surface sensor device to implement, at least, a part of a surface detecting unit 110F10 (illustrated in FIG. 14). A Description is given below of an example where the liquid discharge apparatus 110 includes four surface sensor devices. The number of surface sensor devices can be five or greater than five.

In the description below, the surface sensor device provided for the liquid discharge head unit 210K for black is referred to as "sensor device SENK". Similarly, the surface sensor device provided for the liquid discharge head unit 210C for cyan is referred to as "sensor device SENC". The surface sensor device provided for the liquid discharge head unit 210M for magenta is referred to as "sensor device SENM". The surface sensor device provided for the liquid discharge head unit 210Y for yellow is referred to as "sensor device SENY". In the description below, the sensor devices SENK, SENC, SENM, and SENY may be collectively referred to as "sensor devices SEN" or "surface sensor devices".

Further, the term "location of surface sensor device" means the position where the detection is performed. Accordingly, it is not necessary that all components relating to the detection are disposed at the "location of surface sensor device". In one embodiment, some of the components are coupled to the optical sensor via a cable and disposed away therefrom. In FIG. 2, references "SENK, SENC, SENM, and SENY" are given at respective example locations of surface sensor devices in the liquid discharge apparatus 110.

Figure 3A:
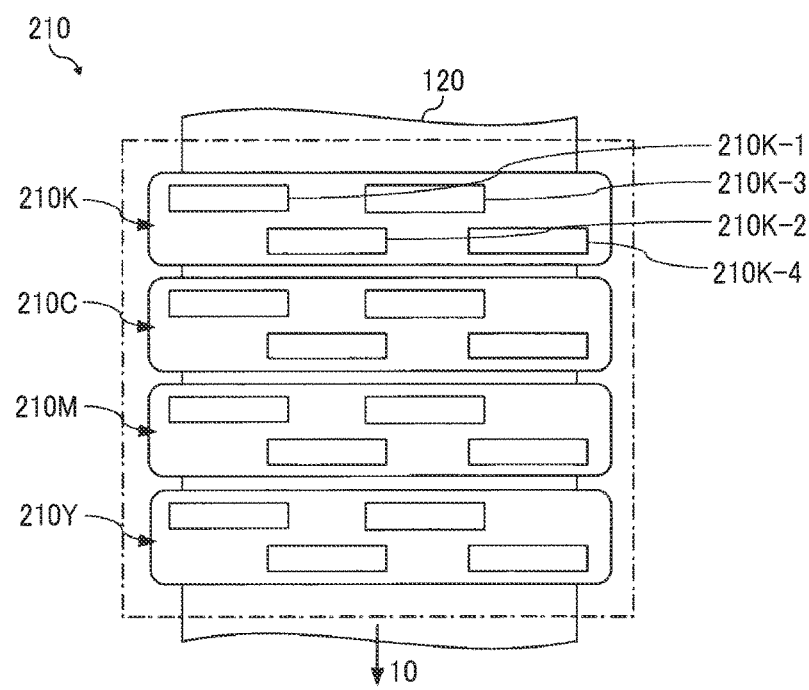
FIGS. 3A and 3B are schematic views illustrating an external shape of a liquid discharge head unit according to an embodiment.
Figure 3B:
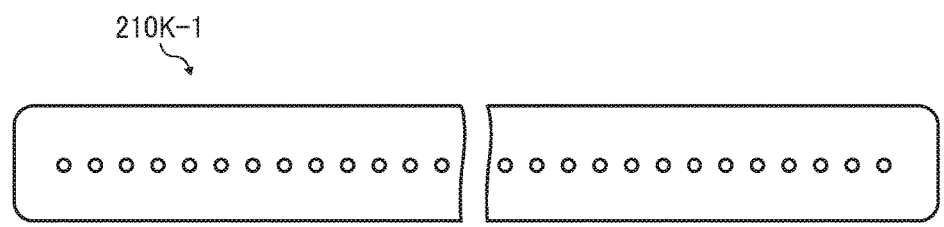

An example outer external of the liquid discharge head unit 210 is described below with reference to FIGS. 3A and 3B. FIG. 3A is a schematic plan view of one of the four liquid discharge head units 210K, 210C, 210M, and 210Y of the liquid discharge apparatus 110.

As illustrated in FIG. 3A, each liquid discharge head unit 210 according to the present embodiment is a line head unit. That is, the liquid discharge apparatus 110 includes the four liquid discharge head units 210K, 210C, 210M, and 210Y arranged in the order of black, cyan, magenta, and yellow in the conveyance direction 10.

For example, the liquid discharge head unit 210K includes four heads 210K-1, 210K-2, 210K-3, and 210K-4 arranged in a staggered manner in the orthogonal direction 20. With this arrangement, the liquid discharge apparatus 110 can form an image across the image formation area on the web 120 in the width direction orthogonal to the conveyance direction 10. The liquid discharge head units 210C, 210M, and 210Y can be similar in structure to the liquid discharge head unit 210K, and the descriptions of other color liquid discharge head units are omitted to avoid redundancy.

Although the description above concerns a liquid discharge head unit including four heads, a liquid discharge head unit including a single head can be used.

Referring back to FIG. 2, the liquid discharge apparatus 110 includes a device, which in the illustrated example is the displacement sensor PSEN, to detect the position of the image formed on the web 120, with the liquid discharged by the liquid discharge head unit 210.

Example of Displacement Sensor

The displacement sensor PSEN can be a contactless sensor to detect the position where the head unit has formed an image. For example, the displacement sensor PSEN is a laser displacement sensor, a complementary metal oxide semiconductor (CMOS) camera, a charge-coupled device (CCD) camera, an optical sensor, a two-dimensional sensor, an area sensor, or a combination thereof. The displacement sensor PSEN can be hardware similar to the hardware to implement the surface detecting unit 110F10 illustrated in FIG. 14. The amount of displacement is represented by the difference in the positions detected by the displacement sensor PSEN. Calculation of the amount of displacement is described below.

Calculation of Amount of Displacement

Initially, displacement of the conveyed object (a recording medium) is described. For example, displacement of the conveyed object arises as follows.

Figure 4:
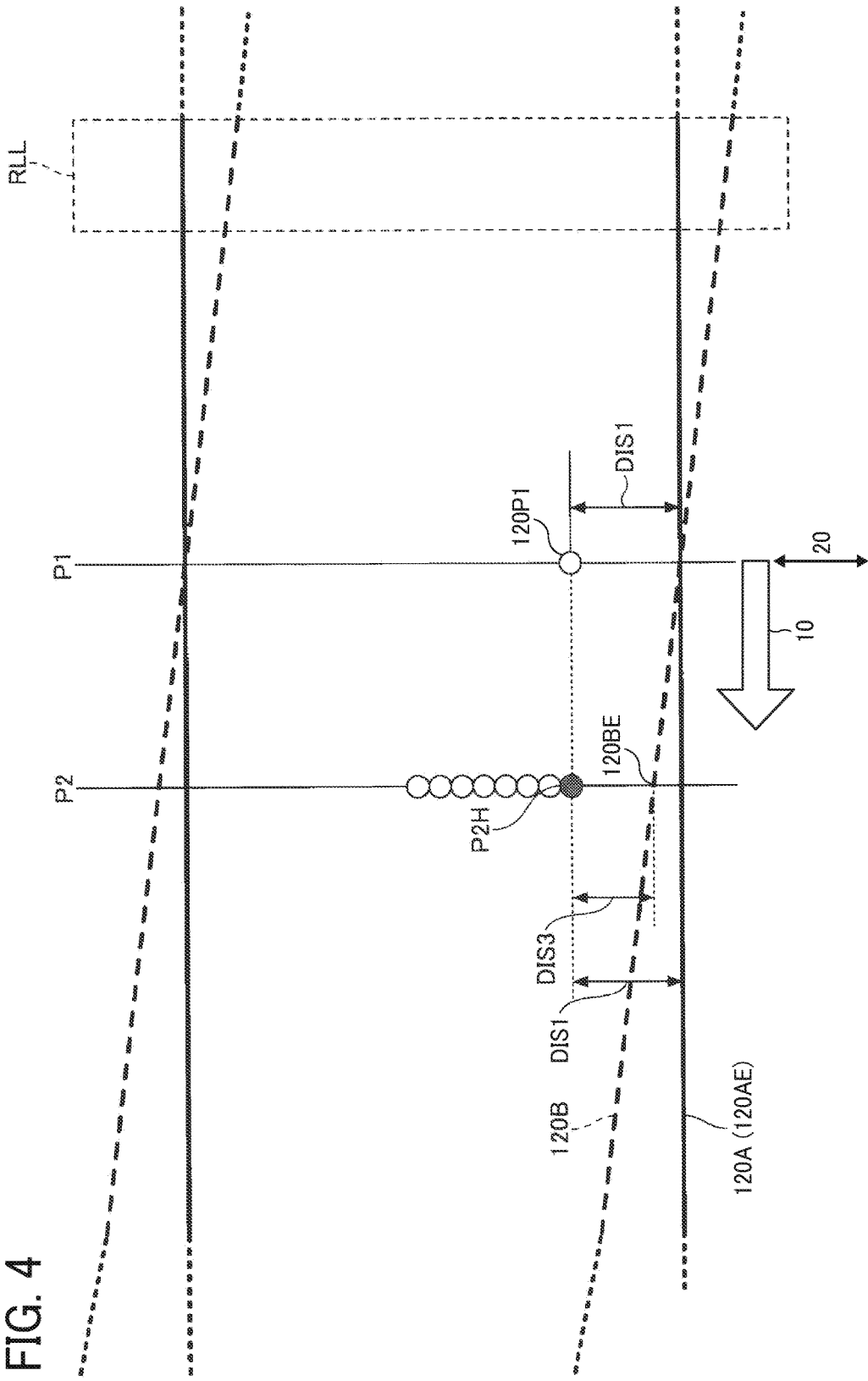
FIG. 4 illustrates an example of displacement of a web.

FIG. 4 illustrates an example of displacement of a web. The web being conveyed by a conveyance roller RLL (e.g., the first roller or the second roller) may be skewed relative to the conveyance direction 10. Generally, the web is set to be parallel to the conveyance direction 10 without skew as indicated by bold lines. Hereinafter the web being in this state is referred to as a no-skew web 120A. In the case of the no-skew web 120A that is not skewed, the amount of displacement is almost zero.

However, for example, the web may be looped askew around the conveyance roller RLL to be skewed as indicated by broken lines. Hereinafter the web being in this state is referred to as a skewed web 120B. The skewed web 120B is at an angle to the conveyance direction 10 compared with the no-skew web 120A. The skewed web 120B is an example of the web having displacement, that is, the state of web in which the amount of displacement is greater than zero.

The orientation and the amount of the skewed web 120B are determined by a physical property of the web, fluctuations in the tension applied to the web, the meandering of the web, orientation of fiber of web, or a combination thereof.

In this example, at a first point P1, the surface sensor device (e.g., the sensor device SENK, SENC, SENM, or SENY illustrated in FIG. 2) detects the position of the web. Further, as described later, the surface sensor device is configured to detect the surface of the conveyed object during image formation and is a part of hardware constructing the surface detecting unit 110F10.

At a second position P2, the liquid is discharged from the liquid discharge head unit and lands on the web.

In this example, at the first position P1, ends of the no-skew web 120A coincide with ends of the skewed web 120B, and a detected position 120P1 detected by the surface sensor device is at a first distance DIS1 from an end position 120AE of the no-skew web 120A and from an end position 120BE of the skewed web 120B. In other words, in this example, at the first position P1, the first distance DIS1 is identical between the no-skew web 120A and the skewed web 120B.

It is assumed that, at the second position P2, for example, at a head position P2H being at the first distance DIS1 from the end position 120AE, the liquid discharge head unit discharges the liquid onto the web. As illustrated in FIG. 4, even when the liquid is discharged similarly at the head position P2H, which is at the first distance DIS1 from the end position 120AE, the landing position of the liquid differs between the no-skew web 120A and the skewed web 120B.

Specifically, the landing position of the liquid on the no-skew web 120A is at the first distance DIS1 from the end position 120AE. By contrast, the landing position of the liquid on the skewed web 120B is at a third distance DIS3 from an end position 120BE of the skewed web 120B.

Even if a given position is detected as being at the first distance DIS1 from the end of the web at the first position P1, this position may be at a different distance from the end of the web at the second position P2 depending on the skew state of the web. Accordingly, even if a given position is detected as being at the first distance DIS1 from the end of the web at the first position P1 and the liquid is discharged at the head position P2H at the second point P2, the landing position of the liquid may be at the first distance DIS1 or the third distance DIS3 from the end of the web depending on the skew state of the web.

In view of the foregoing, in the present embodiment, the liquid discharge apparatus 110 calculates the amount of displacement as follows.

Calculation of Amount of Displacement

The amount of displacement is calculated by, for example, the method disclosed in U.S. Pat. No. 9,782,967-B2, which is hereby incorporated by reference herein. Calculation of the amount of displacement is described below.

Figure 5:
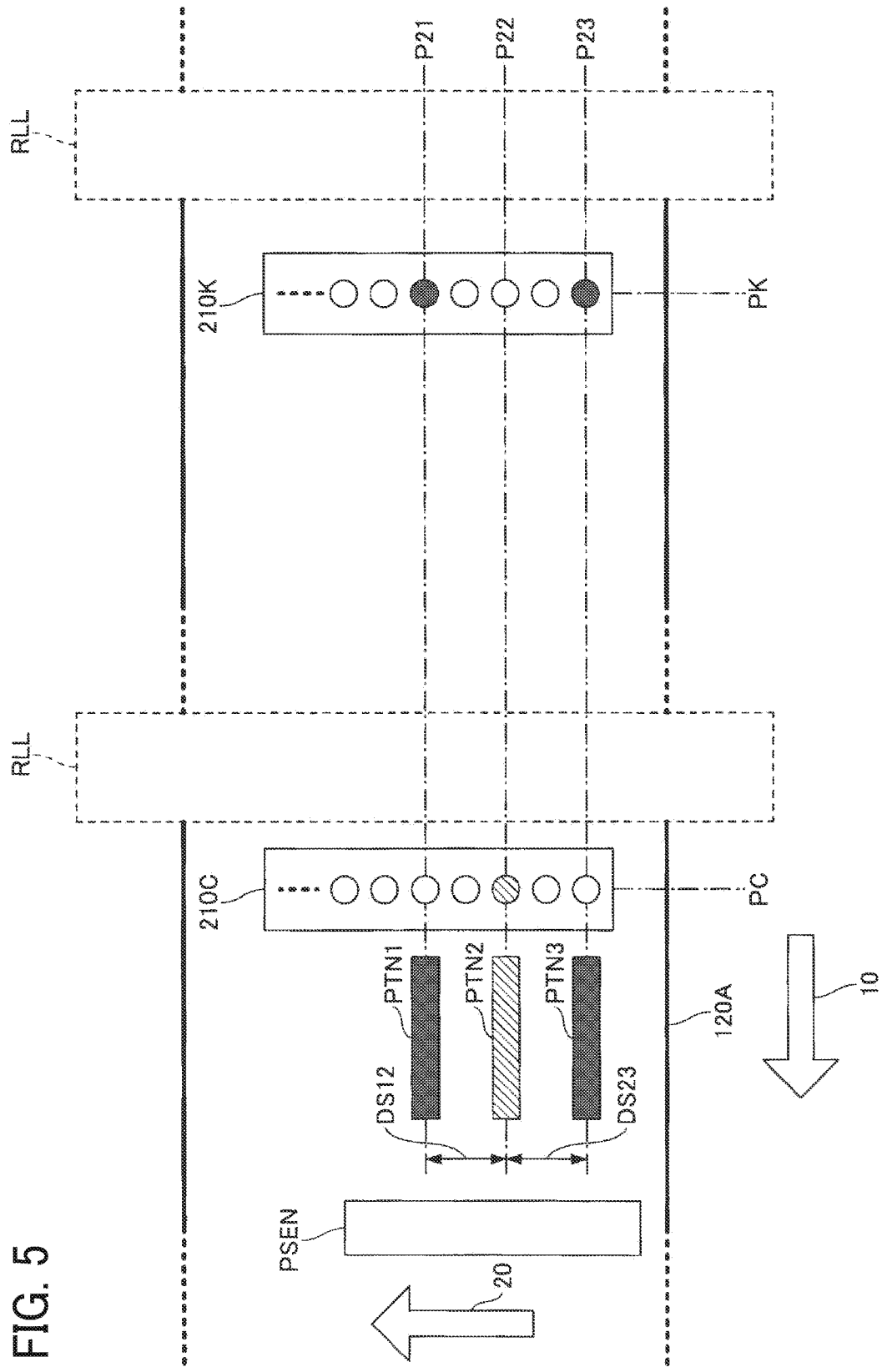
FIG. 5 is an illustration for calculating the amount of displacement according an embodiment.

FIG. 5 is an illustration for calculating the amount of displacement according an embodiment. Descriptions are given below of an example in which the liquid discharge head units 210K and 210 210C discharge liquid onto the no-skew web 120A illustrated in FIG. 4.

In this example, the liquid discharge head unit 210K discharges the liquid at positions P21 and P23 in the orthogonal direction 20 to form a first image pattern PTN1 and a third image pattern PTN3.

After the liquid discharged from the liquid discharge head unit 210K lands thereon, the no-skew web 120A is conveyed in the conveyance direction 10 toward the liquid discharge head unit 210C.

The liquid discharge head unit 210C discharges the liquid at a position P22 in the orthogonal direction 20. The position P22 is a midpoint between the positions P21 and P23. Thus, the liquid discharge head unit 210K discharges the liquid to form a second image pattern PTN2.

Accordingly, on the no-skew web 120A, the second image pattern PTN2 is formed at the midpoint between the first image pattern PTN1 and the third image pattern PTN3 in the orthogonal direction 20.

The displacement sensor PSEN detects the position where the liquid has landed, that is, the position of the plurality of patterns, at a position downstream in the conveyance direction 10 from the liquid discharge head unit 210C.

The detection area of the displacement sensor PSEN is set so cover the plurality of patterns in one detection. That is, the displacement sensor PSEN is configured to perform imaging to capture the plurality of patterns in one image (one frame) for the detection. Note that the timing of detection can be different in relation to reading out of data indicating the detection result, from the displacement sensor PSEN.

Subsequently, based on the detection result generated by the displacement sensor PSEN, the liquid discharge apparatus 110 determines whether to adjust position of the liquid discharge head unit 210. This position is used as an initial position of the liquid discharge head unit 210 to be moved. Descriptions are given below of determination whether to adjust the cyan liquid discharge head unit 210C.

In this example, the liquid discharge apparatus 110 determines whether the second image pattern PTN2 is located at the midpoint between the first image pattern PTN1 and the third image pattern PTN3, to determine whether to adjust the position of the cyan liquid discharge head unit 210C.

On the no-skew web 120A, the second image pattern PTN2 is at the midpoint between the first image pattern PTN1 and the third image pattern PTN3. In order to determine whether the second image pattern PTN2 is at the midpoint, for example, the liquid discharge apparatus 110 compares the distances between the patterns, namely, a first image distance DS12 between the first and second image patterns PTN1 and PTN2 and a second image distance DS23 between the second and third image patterns PTN2 and PTN3. Determining that the first image distance DS12 is identical or almost identical to the second image distance DS23, the liquid discharge apparatus 110 determines that the second image pattern PTN2 is positioned at the midpoint. In other words, in the state where the first image distance DS12 is almost identical to the second image distance DS23, the liquid discharge apparatus 110 can determined that the web is not skewed (i.e., the no-skew web 120A).

When the second image pattern PTN2 is located at the midpoint between the first image pattern PTN1 and the third image pattern PTN3, the liquid discharge apparatus 110 determines not to adjust the cyan liquid discharge head unit 210C. By contrast, when the second image pattern PTN2 is located at a position deviated by a predetermined amount or greater from the midpoint between the first image pattern PTN1 and the third image pattern PTN3, the liquid discharge apparatus 110 determines to adjust the cyan liquid discharge head unit 210C.

Accordingly, in the case of the no-skew web 120A, the liquid discharge apparatus 110 determines that the second image pattern PTN2 is positioned at the midpoint between the first image pattern PTN1 and the third image pattern PTN3. Therefore, the liquid discharge apparatus 110 determines not to adjust the cyan liquid discharge head unit 210C.

In this example, the deviation of the second image pattern PTN2 from the midpoint between the first image pattern PTN1 and the third image pattern PTN3 represents the amount of displacement. In other words, the amount of displacement is an amount representing the position of the second image pattern PTN2 with reference to the midpoint between the first image pattern PTN1 and the third image pattern PTN3 is the amount of displacement.

Accordingly, when the web 120 is not skewed and the second image pattern PTN2 is positioned almost at the midpoint between the first image pattern PTN1 and the third image pattern PTN3, the amount of displacement is almost zero. By contrast, when the second image pattern PTN2 is deviated from the midpoint, there is displacement.

For example, in the case of the skewed web 120B, there is displacement.

Figure 6:
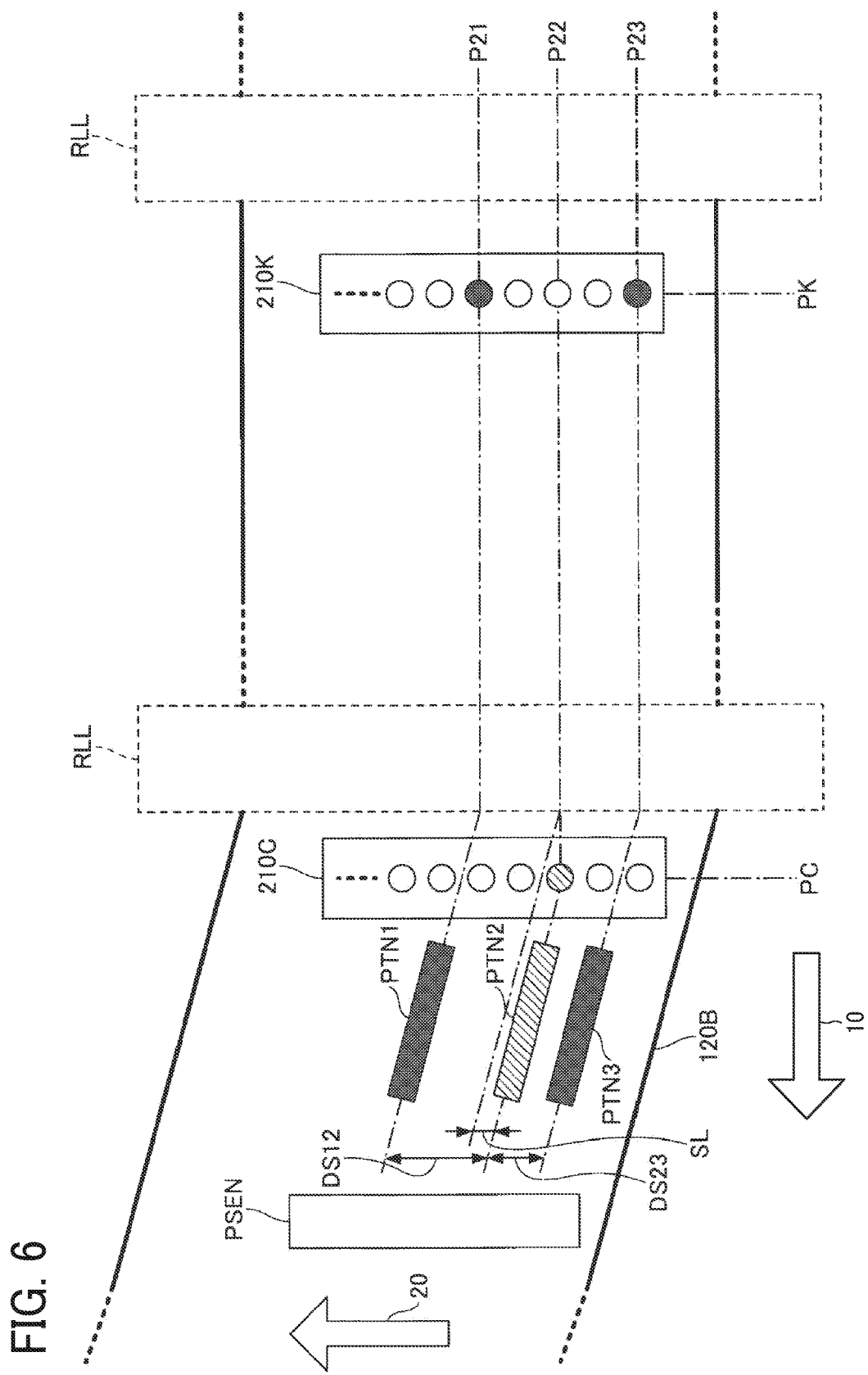
FIG. 6 is another illustration for calculating the amount of displacement according an embodiment.

FIG. 6 is another illustration for calculating the amount of displacement according an embodiment. FIG. 6 is different from FIG. 5 in that the web is skewed (i.e., the skewed web 120B) as illustrated in FIG. 4. Redundant descriptions with respect to FIG. 5 are omitted.

In the illustrated example, the web 120B is skewing, starting at a position downstream from the black landing position PK and upstream from the cyan landing position PC.

In the case of the skewed web 120B, although the liquid discharge head units 210K and 210C discharge liquid similarly to the state illustrated in FIG. 5, the image patterns are formed differently from the image patterns illustrated in FIG. 5. In FIG. 6, due to the skew, the second image pattern PTN2 is shifted closer to the third image pattern PTN3 from the midpoint between the first image pattern PTN1 and the third image pattern PTN3, compared with the second image pattern PTN2 in FIG. 5.

On the skewed web 120B, the first image distance DS12 is different from the second image distance DS23. That is, as the web 120B skews, the second image pattern PTN2 is shifted from the midpoint between the first image pattern PTN1 and the third image pattern PTN3. Thus, in the case of the skewed web 120B, there is a displacement amount SL.

As the displacement sensor PSEN detects the respective positions of the image patterns, the displacement amount SL can be calculated. Specifically, the displacement sensor PSEN detects the positions of the first and third image patterns PTN1 and PN3 in the orthogonal direction 20. The positions are represented by coordinates, for example.

Subsequently, the liquid discharge apparatus 110 calculates the midpoint between the first and third image patterns PTN1 and PN3. For example, the liquid discharge apparatus 110 calculates the coordinate of the midpoint between the coordinate of the first image pattern PTN1 and the coordinate of the third image pattern PTN3, as a reference coordinate.

Subsequently, the displacement sensor PSEN detects the position of the second image pattern PTN2 in the orthogonal direction 20. The liquid discharge apparatus 110 calculates the difference between the reference coordinate and the coordinate of the second image pattern PTN2 detected, to calculate the displacement amount SL. The method for calculating the displacement amount SL is not limited to the above-described method.

In the presence of such displacement, the liquid discharged from the liquid discharge head unit 210 can land at a position deviated from an intended position. Even if it is preferred to move the head unit based on the detection results generated by the surface sensor devices during image formation, in some cases, it is possible that the surface sensor devices are too away from each other to detect the same position. In this case, tracking the meandering of the web 120 is not feasible. That is, displacement can result in misalignment in color superimposition (an image is out of color registration). Then, the quality of the image is degraded.

Therefore, in the presence of such displacement, the liquid discharge apparatus 110 moves the liquid discharge head unit 210 based on the calculated displacement amount, for example, as follows.

Figure 7:
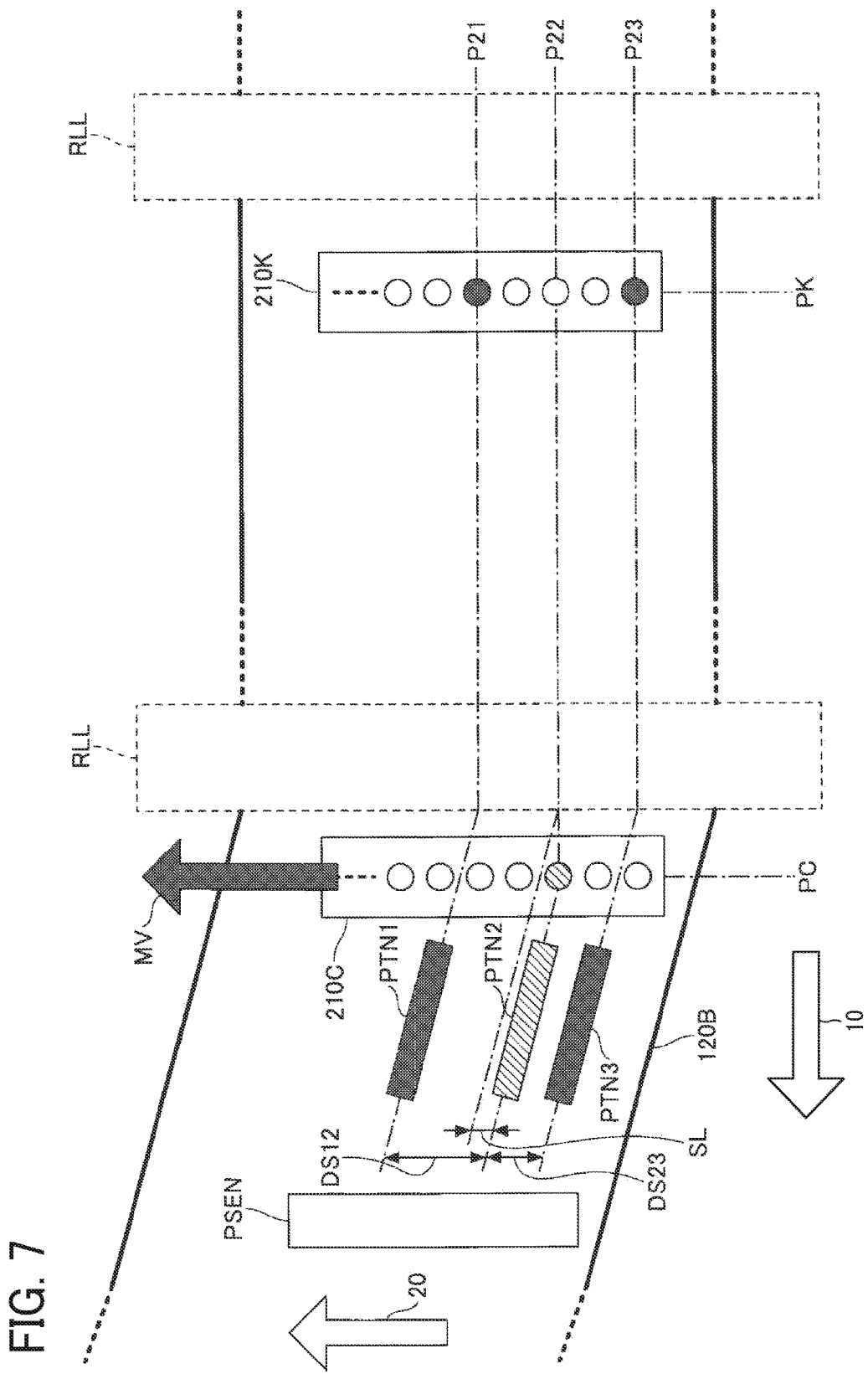
FIG. 7 is a schematic illustration of position adjustment of the liquid discharge head unit according to an embodiment.

Referring to FIG. 7, descriptions are given below of position adjustment of the liquid discharge head unit 210, performed in the presence of displacement illustrated in FIG. 6.

The liquid discharge apparatus 110 moves, for example, the liquid discharge head unit 210C as indicated by arrow MV by a distance (hereinafter "adjustment distance") determined based on the displacement amount SL. In this example, the liquid discharge apparatus 110 moves the liquid discharge head unit 210C by an adjustment distance identical to the displacement amount SL toward the position where the first image pattern PTN1 is formed (upward in FIG. 7), to eliminate the displacement amount SL. With this adjustment, the liquid discharge head unit 210C is moved to adjust the position of the second image pattern PTN2 to the midpoint between the first and third image patterns PTN1 and PTN3.

As the liquid discharge head unit 210 is moved based on the displacement amount SL, the amount of displacement in the landing position of the liquid on the skewed web 120B can be reduced. Accordingly, misalignment in color superimposition is minimized, and image quality improves.

Note that the liquid discharge head unit 210 to be moved is not limited to the liquid discharge head unit 210C. In the example illustrated in FIG. 7, the liquid discharge head unit 210C is adjusted relative to the liquid discharge head unit 210K that is used as a reference. That is, an image formation position of color other than black is adjusted relative to an image formation position of black.

Alternatively, another color can be used as the reference. In example illustrated in FIG. 7, the liquid discharge head unit 210K can be moved relative to the image formation position of another color used as the reference.

The liquid discharge head unit 210 is moved, for example, by a hardware configuration described below.

Head Moving Device

Figure 8:
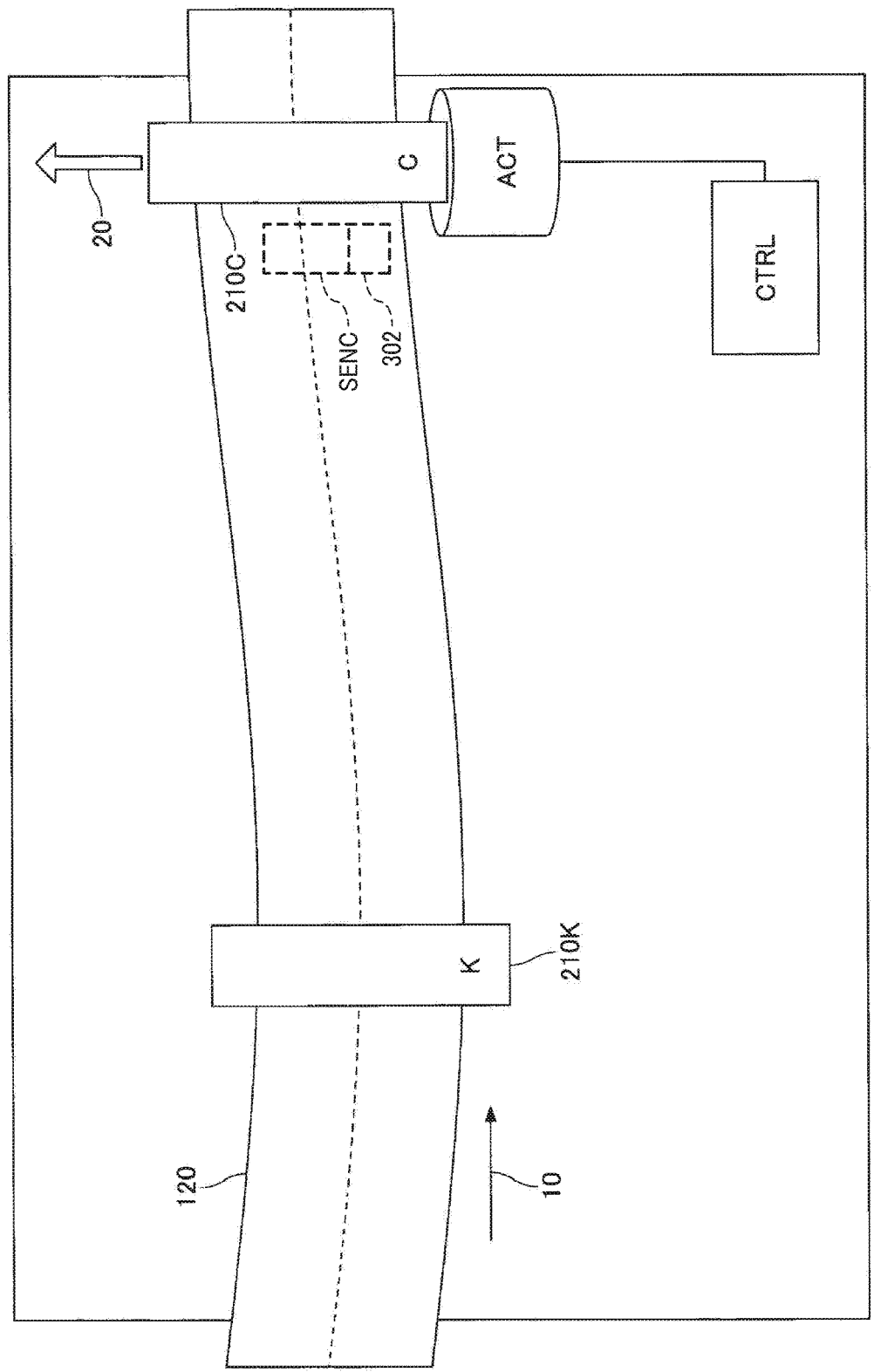
FIG. 8 is a schematic diagram of an example mechanism to move the liquid discharge head unit of the liquid discharge apparatus, according to an embodiment.

FIG. 8 is a schematic diagram of an example mechanism to move the liquid discharge head unit of the liquid discharge apparatus according to the present embodiment. The mechanism is implemented, for example, by the hardware configuration illustrated in FIG. 8. In the mechanism illustrated is for moving the liquid discharge head unit 210C.

In the illustrated example, the actuator ACT such as a linear actuator is coupled to the liquid discharge head unit 210C to move the liquid discharge head unit 210C. To the actuator ACT, the controller CTRL to control the actuator ACT is connected.

The actuator ACT is, for example, a linear actuator or a motor. The actuator ACT can include a control circuit, a power circuit, and a mechanical component.

To the controller CTRL, the adjustment distance by which the liquid discharge head unit 210C is to be moved is input. The controller CTRL drives the actuator ACT to move the liquid discharge head unit 210C by the adjustment distance to compensate for the displacement amount SL (illustrated in FIG. 7) of the web 120.

The controller 520 illustrated in FIG. 2 is described below.

Figure 9:
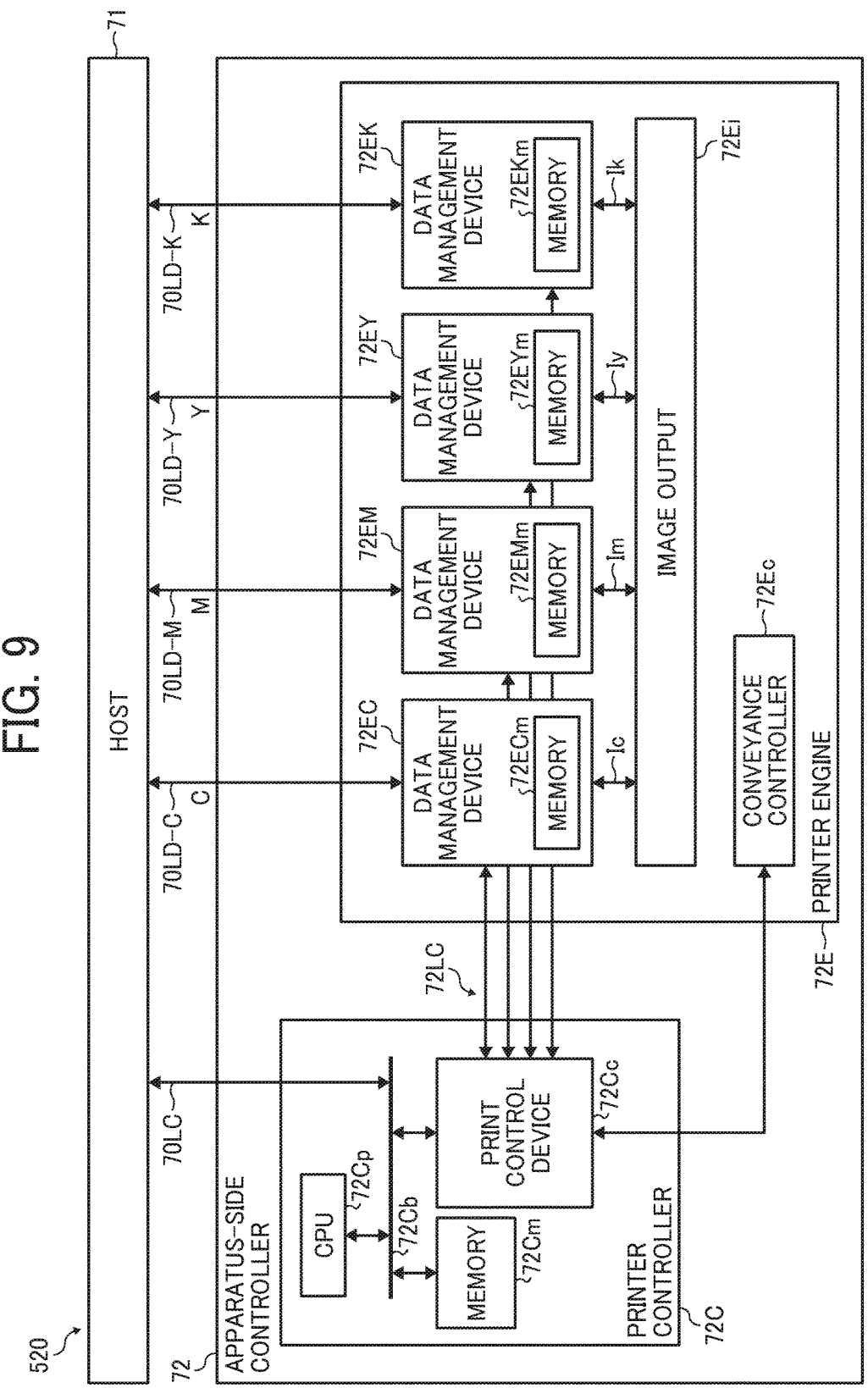
FIG. 9 is a schematic block diagram of a hardware configuration of a controller according to an embodiment.

FIG. 9 is a schematic block diagram of control configuration according to the present embodiment. For example, the controller 520 includes a host 71 (or a higher-order device), such as an information processing apparatus, and an apparatus-side controller 72. In the illustrated example, the controller 520 causes the apparatus-side controller 72 to form an image on a recording medium according to image data and control data input from the host 71.

Examples of the host 71 include a client computer (personal computer or PC) and a server. The apparatus-side controller 72 includes a printer controller 72C and a printer engine 72E.

The printer controller 72C governs operation of the printer engine 72E. The printer controller 72C transmits and receives the control data to and from the host 71 via a control line 70LC. The printer controller 72C further transmits and receives the control data to and from the printer engine 72E via a control line 72LC. Through such data transmission and reception, the control data indicating printing conditions and the like are input to the printer controller 72C. The printer controller 72C stores the printing conditions, for example, in a resistor. The printer controller 72C then controls the printer engine 72E according to the control data to form an image based on print job data, that is, the control data.

The printer controller 72C includes a central processing unit (CPU) 72Cp, a print control device 72Cc, and a memory 72Cm. The CPU 72Cp and the print control device 72Cc are connected to each other via a bus 72Cb to communicate with each other. The bus 72Cb is connected to the control line 70LC via a communication interface (I/F) or the like.

The CPU 72Cp controls the entire apparatus-side controller 72 based on a control program and the like. That is, the CPU 72Cp is a processor as well as a controller.

The print control device 72Cc transmits and receives data indicating a command or status to and from the printer engine 72E, based on the control date transmitted from the host 71. Thus, the print control device 72Cc controls the printer engine 72E.

To the printer engine 72E, a plurality of data lines, namely, data lines TOLD-C, TOLD-M, TOLD-Y, and TOLD-K are connected. The printer engine 72E receives the image data from the host 71 via the plurality of data lines. Then, the printer engine 72E performs image formation of respective colors, controlled by the printer controller 72C.

The printer engine 72E includes a plurality of data management devices, namely, data management devices 72EC, 72EM, 72EY, and 72EK respectively including memory 72ECm, 72EMm, 72EYm, and 72EKm. The printer engine 72E includes an image output 72Ei and a conveyance controller 72Ec.

Figure 10:
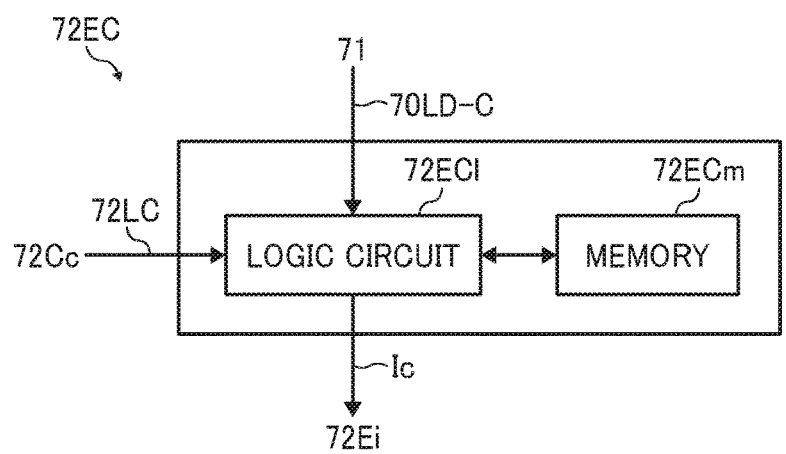
FIG. 10 is a block diagram of a hardware configuration of a data management device of the controller illustrated in FIG. 9.

FIG. 10 is a block diagram of a configuration of the data management device 72EC. For example, the plurality of data management devices 72EC, 72EM, 72EY, and 72EK can have an identical configuration, and the data management device 72EC is described below as a representative. Redundant descriptions are omitted.

The data management device 72EC includes a logic circuit 72EC1 and the memory 72ECm. As illustrated in FIG. 10, the logic circuit 72EC1 is connected via a data line 70LD-C to the host 71. The logic circuit 72EC1 is connected via the control line 72LC to the print control device 72Cc. The logic circuit 72EC1 is implemented by, for example, an application specific integrated circuit (ASIC) or a programmable logic device (PLD).

According to a control signal input from the printer controller 72C (illustrated in FIG. 9), the logic circuit 72EC1 stores, in the memory 72ECm, the image data input from the host 71.

According to a control signal input from the printer controller 72C, the logic circuit 72EC1 retrieves, from the memory 72ECm, cyan image data Ic. The logic circuit 72EC1 then transmits the cyan image data Ic to the image output 72Ei. Similarly, magenta image data Im, yellow image data Iy, and black image data Ik are transmitted to the image output 72Ei.

The memory 72ECm preferably has a capacity to store image data extending about three pages. With the capacity to store image data extending about three pages, the memory 72ECm can store the image data input from the host 71, data image being used current image formation, and image data for subsequent image formation.

Figure 11:
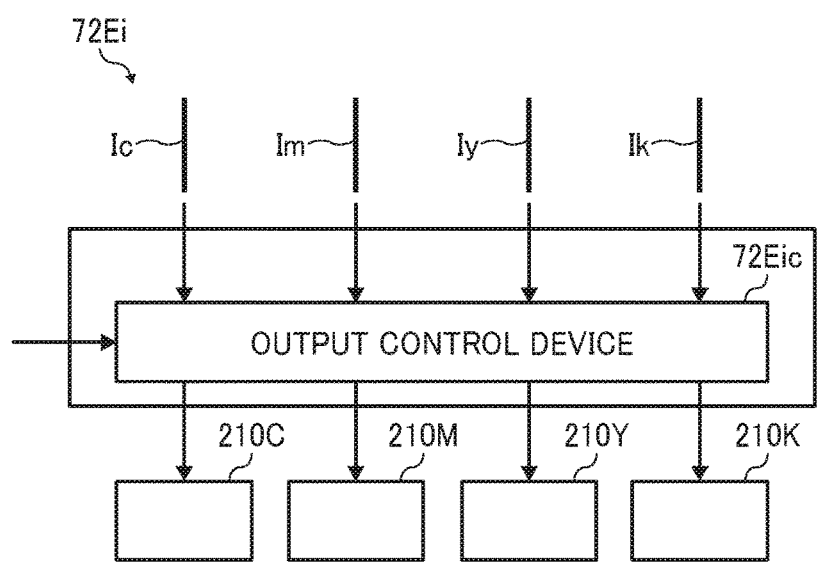
FIG. 11 is a block diagram of a hardware configuration of an image output device of the controller illustrated in FIG. 9.

FIG. 11 is a block diagram of a configuration of the image output 72Ei. In this block diagram, the image output 72Ei is constructed of an output control device 72Eic and the liquid discharge head units 210K, 210C, 210M, and 210Y.

The output control device 72Eic outputs the image data for respective colors to the liquid discharge head units 210. That is, the output control device 72Eic controls the liquid discharge head units 210 based on the image data input thereto.

The output control device 72Eic controls the plurality of liquid discharge head units 210 either simultaneously or individually. That is, the output control device 72Eic receives timing commands and changes the timings at which the liquid discharge head units 210 discharge respective color inks. The output control device 72Eic can control one or more of the liquid discharge head units 210 based on the control signal input from the printer controller 72C (illustrated in FIG. 9). Alternatively, the output control device 72Eic can control one or more of the liquid discharge head units 210 based on user instructions.

In the example illustrated in FIG. 9, the apparatus-side controller 72 has different routes for inputting the image data from the host 71 and for transmission and reception of control data, with the host 71 and the apparatus-side controller 72.

The apparatus-side controller 72 may instruct formation of single-color images using one color ink, for example, black ink. In the case of single-color image formation using black ink, to accelerate image formation speed, the liquid discharge apparatus 110 can include one data management device (the data management devices 72EC, 72EM, 72EY, or 72EK) and four black liquid discharge head units 210. In such as configuration, the plurality of black liquid discharge head units 210K discharge black ink. Accordingly, the image formation speed is faster than that in the configuration using one black liquid discharge head unit 210K.

The conveyance controller 72Ec (in FIG. 9) includes a motor, a mechanism, and a driver for conveying the web 120. For example, the conveyance controller 72Ec controls the motor coupled to the rollers to convey the web 120.

Position Adjustment

Figure 12:
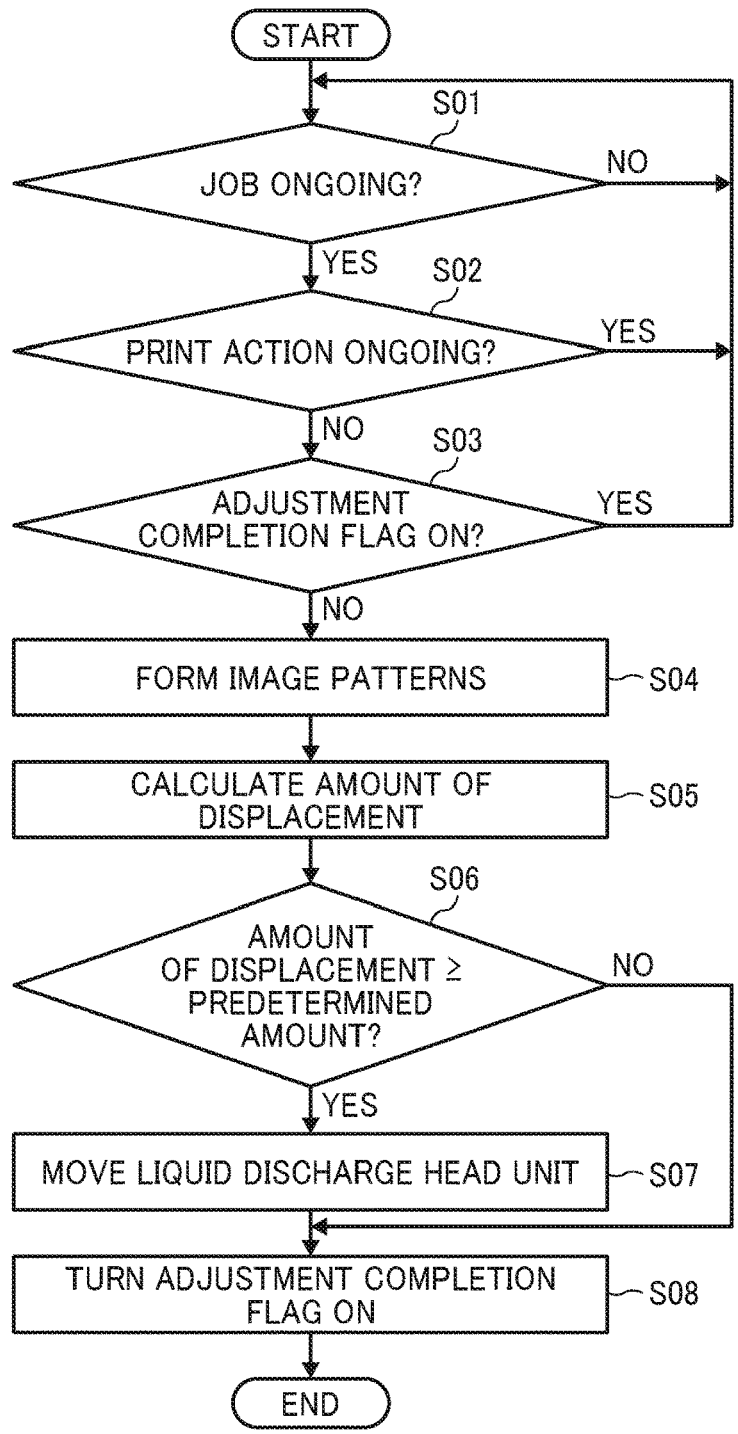
FIG. 12 is a flowchart of position adjustment performed by the liquid discharge apparatus; according to an embodiment.

FIG. 12 is a flowchart of position adjustment performed by the liquid discharge apparatus 110 according to the present embodiment. For example, the liquid discharge apparatus 110 adjusts the position of the head unit as follows.

At S01, the liquid discharge apparatus 110 determines whether there is an ongoing print job. Specifically, instructed by a host, the liquid discharge apparatus 110 starts image formation. At S01, instructed by the host, the liquid discharge apparatus 110 determines whether there is an ongoing print job.

When the liquid discharge apparatus 110 determines that there is an ongoing print job (Yes at S01), the process proceeds to S02. By contrasts, when the liquid discharge apparatus 110 determines that there is no ongoing print job (No at S01), the process repeats S01.

At S02, the liquid discharge apparatus 110 determines whether a print action is ongoing. The print action is discharge of liquid for image formation based on image data transmitted from the host. During a print job, there is timing where a print action is ongoing and there is timing where a print action is not ongoing.

During a print action, according to the image data, the liquid discharge apparatus 110 discharges the liquid onto the web to form an image indicated by the image data. By contrast, when a print action is not ongoing during a print job, the liquid discharge apparatus 110 conveys so-called "sheet loss".

The portion of the recording medium (e.g., a web) conveyed before or after the print action is the sheet loss. For example, in a case where image formation is performed by two liquid discharge apparatuses coupled together, before a print action, cockling of the web 120 due to drying affects an image to be formed. Accordingly, the sheet loss occurs, at least, in a section extending from a drying roller of the upstream liquid discharge apparatus to the liquid discharge head unit of the downstream liquid discharge apparatus in the direction of conveyance of the web. After the print action, the sheet loss occurs, at least, in a section extending from the liquid discharge head unit of the downstream liquid discharge apparatus to a sheet processing apparatus in the direction of conveyance of the web.

Performing the steps after S03 during sheet loss conveyance is preferred. In the steps after S03, the image patterns are formed as illustrated in FIGS. 5 and 6, to calculate the amount of displacement of the web. It is preferable not to form such image patterns in a section in which the print action is performed. Performing the steps after S03 during sheet loss conveyance (No at S02) can prevent the image patterns from disturbing an image to be formed, thereby securing image quality. Note that the image patterns are not necessarily formed during a print job but can be formed in any occasion of sheet loss. For example, the image pattern can be formed immediately after the paper is set in the liquid discharge apparatus 110.

When the liquid discharge apparatus 110 determines that a print action is ongoing (Yes at S02), the process returns to S01. By contrasts, when the liquid discharge apparatus 110 determines that a print action is not ongoing (No at S02), the process proceeds to S03.

At S03, the liquid discharge apparatus 110 determines whether the position of the liquid head unit 210 has been adjusted, that is, whether the liquid discharge head unit 210 has been moved as adjustment at Step S07 to be described later. Specifically, at S03, the liquid discharge apparatus 110 determines whether the position of the liquid discharge head unit 210 has been adjusted to reduce the amount of displacement to almost zero.

In this example, the liquid discharge apparatus 110 determines whether the adjustment has been performed, for example, based on on/off of adjustment completion flag, stored in the memory of the controller. Accordingly, in this example, the liquid discharge apparatus 110 determines whether the position of the liquid head unit 210 has been adjusted based on the adjustment completion flag. The adjustment completion flag indicates "OFF" as an initial value, that is, before the adjustment is performed. After Step S07 is performed, the adjustment completion flag is set to "ON".

When the liquid discharge apparatus 110 determines that the adjustment has been performed, that is, the adjustment completion flag is "ON" (Yes at S03), the process returns to Step S01. When the liquid discharge apparatus 110 determines that the adjustment is not yet performed, that is, the adjustment completion flag is "OFF" (No at S03), the process proceeds to Step S04 and the image patterns are formed.

At S05, the liquid discharge apparatus 110 calculates the amount of displacement as illustrated in FIG. 6. Note that it is preferred to perform Steps S05 through S08 individually for each liquid discharge head unit 210 to be adjusted.

At S06, the liquid discharge apparatus 110 determines whether or not the amount of displacement is equal to or greater than a predetermined amount. The predetermined amount is preferably a smallest unit amount for the liquid discharge apparatus 110 to move the liquid discharge head unit 210. Specifically, in a configuration in which the liquid discharge head unit 210 is to be moved by 1-micrometer resolution, the predetermined amount is preferably 1 micrometer.

In moving the liquid discharge head unit 210 at S07, setting the predetermined amount identical to the resolution enables the liquid discharge apparatus 110 to efficiently reduce the displacement.

When the liquid discharge apparatus 110 determines that the amount of displacement is equal to or greater than the predetermined amount (Yes at S06), the process proceeds to S07. By contrast, when the liquid discharge apparatus 110 determines that the amount of displacement is not equal to or greater than the predetermined amount (No at S06), the process proceeds to S08.

At S07, the liquid discharge apparatus 110 moves the liquid discharge head unit 210, for example, as illustrated in FIG. 7. In this case, the predetermined amount is preferably the distance between adjacent nozzles (nozzle interval).

Note that, to adjust the landing position, not necessarily the liquid discharge head unit is moved but can be, for example, the position of the nozzle to discharge the liquid can be changed.

At S08, the liquid discharge apparatus 110 sets the adjustment completion flag to "ON". When the displacement is made almost zero by the adjustment at S07 or indicated as almost zero by the result as the calculation at S05, the image patterns formed by the liquid discharge apparatus 110 are, for example, in the state illustrated in FIG. 5. The adjustment completion flag being "ON" is data indicating that the adjustment has been performed at S07 or the amount of displacement is zero (or almost zero). The type of such data is not limited to the adjustment completion flag.

Functional Configuration

Figure 13:
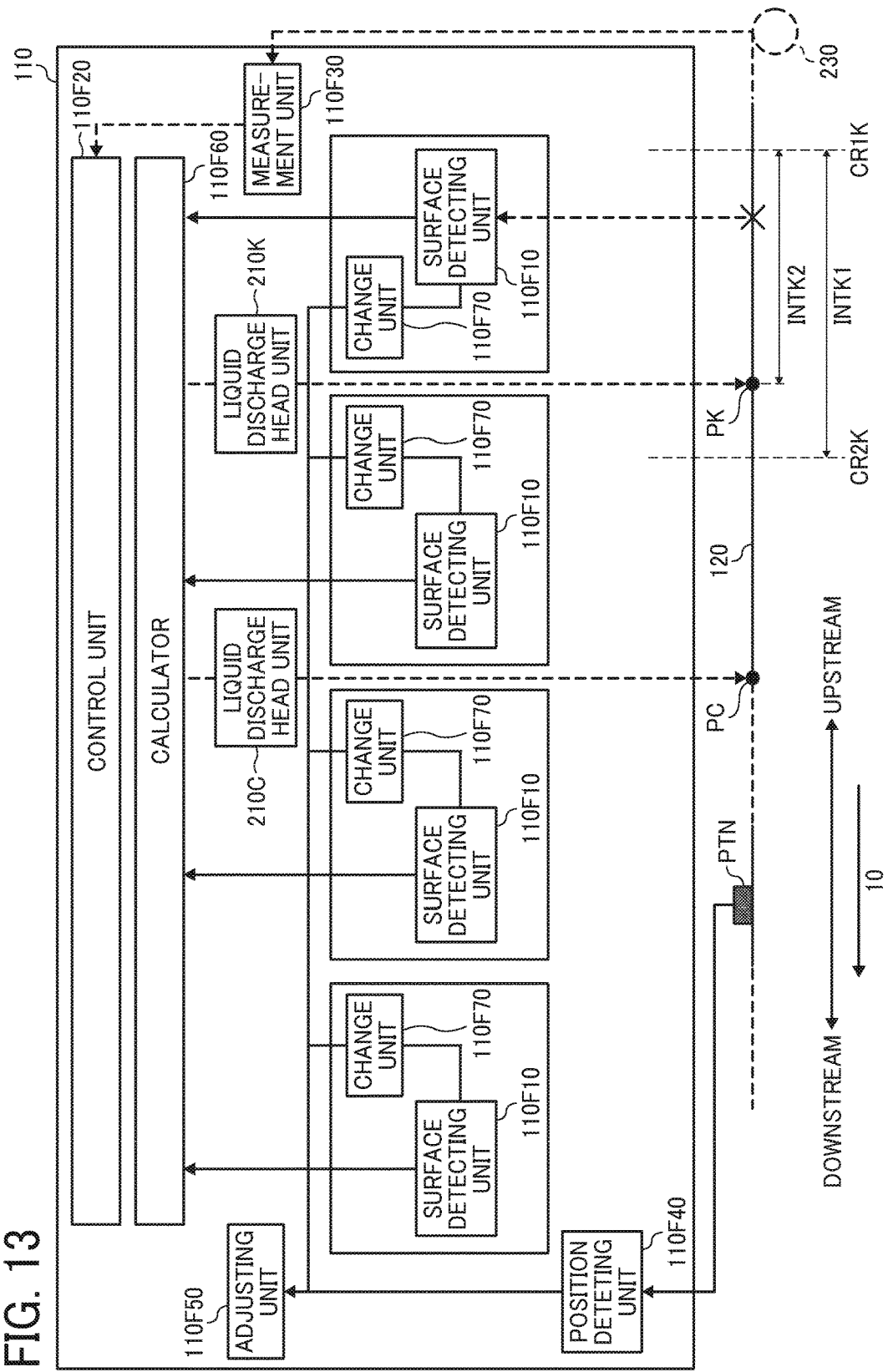
FIG. 13 is a schematic functional block diagram of the liquid discharge apparatus, according to an embodiment.

FIG. 13 is a schematic block diagram of a functional configuration of the liquid discharge apparatus 110. In this example, the liquid discharge apparatus 110 includes a position detecting unit 110F40 and an adjusting unit 110F50. The liquid discharge apparatus 110 preferably further includes the surface detecting unit 110F10 and a change unit 110F70 for each liquid discharge head unit 210, and, more preferably, further includes a measurement unit 110F30 and a calculator 110F60. The surface detecting unit 110F10 functions to detect a surface of the web 120 during image formation by the liquid discharge head unit 210. The measurement unit 110F30 functions to measure the amount of conveyance of the web 120. The calculator 110F60 functions to calculate at least one of the position, speed of movement, and amount of movement of the web 120 from the output from the surface detecting unit 110F10. The functions of the surface detecting unit 110F10 and the measurement unit 110F30 are described later. The change unit 110F70 functions to change the origin of the position detected by the surface detecting unit 110F10.

The liquid discharge head units 210 are disposed at different positions from each other in the conveyance path of the conveyed object, for example, as illustrated in FIG. 2. Presented below are descriptions relating to the cyan liquid discharge head unit 210C illustrated in FIG. 2, as an example.

Example of Position Detecting Unit

The position detecting unit 110F40 is configured to detect the operation positions such as the landing positions at which the liquid droplets discharged from the liquid discharge head units 210K and 210C land on the conveyed object. The adjusting unit 110F50 is configured to calculate the displacement of the liquid discharge head unit 210C relative to the liquid discharge head unit 210K, based on the landing positions detected by the position detecting unit 110F40. For example, the position detecting unit 110F40 is implemented by the displacement sensor PSEN (illustrated in FIG. 2).

As the liquid droplets land on the web, as illustrated in FIG. 5, the first and third image patterns PTN1 and PTN3 are formed with the liquid droplets discharged from the liquid discharge head unit 210K. Then, the second image pattern PTN2 is formed with the liquid discharged from the liquid discharge head unit 210C. Thus, a combination pattern (i.e., a position adjustment image) including the first, second, and third image patterns PTN1, PTN2, and PTN3 (also collectively "image patterns PTN") is formed. Subsequently, the adjusting unit 110F50 detects the positions of the image patterns PTN to detect the position, in the orthogonal direction 20, of the operation position of the liquid discharge head unit 210C relative to the liquid discharge head unit 210K. Specifically, the displacement sensor PSEN detects the image patterns PTN to detect the processing position.

Note that the displacement sensor PSEN is configured to detect a possible range of displacement. For example, the displacement sensor PSEN is configured to detect a range of about ±1.5 mm. The range detected by the displacement sensor PSEN can be different from the range detected by the surface detecting unit 110F10. The range detected by the displacement sensor PSEN can be set based on the recording media type or the type of the liquid discharge head unit 210.

The adjusting unit 110F50 is configured to calculate the displacement of the landing position detected by the displacement sensor PSEN, as illustrated in FIG. 6, for example. For example, the adjusting unit 110F50 is implemented by the controller 520 illustrated in FIG. 2.

The adjusting unit 110F50 adjusts the landing position in the direction orthogonal to the conveyance direction 10, based on the displacement calculated based on the landing position. The adjusting unit 110F50 moves the liquid discharge head unit 210 to adjust the landing position in the orthogonal direction 20, for example, as illustrated in FIG. 7. The landing position after the adjusting unit 110F50 changes the landing position is referred to as "adjusted position". In this case, the adjusting unit 110F50 moves the liquid discharge head unit 210 in the orthogonal direction 20, with a head moving unit 110F80 (see FIG. 16) implemented by, for example, the hardware illustrated in FIG. 8. As described above, alternatively, the nozzle position can be changed to adjust the landing position.

In the case where the adjusting unit 110F50 adjusts the landing position of the liquid discharge head unit based on the displacement, the change unit 110F70 changes the origin of detection by the surface detecting unit 110F10 during image formation. The change unit 110F70 moves the position of the sensor based on the amount of displacement using, for example, an actuator 302 illustrated in FIG. 8 similar to the hardware to move the head moving unit 110F80, to change the origin.

Alternatively, in the area detected by the surface detecting unit 110F10, the change unit 110F70 changes the coordinate of the origin in an area detected by the surface detecting unit 110F10, based on the amount of displacement, to change the origin. In other words, the change unit 110F70 can change the origin to use a portion of the area detected by the surface detecting unit 110F10. For example, the change unit 110F70 is implemented by a control circuit 52 described later.

As described above, the adjusting unit 110F50 adjusts the landing position based on the landing position detected by the position detecting unit 110F40. After the adjustment by the adjusting unit 110F50, the change unit 110F70 changes the origin used in the detection by the surface detecting unit 110F10. With the surface detecting unit 110F10, since the adjustment is performed even when image formation is executed, the liquid discharge apparatus 110 can improve the accuracy of the landing position of the liquid discharged. The detecting the position of the web 120 by the surface detecting unit 110F10 performed during image formation and moving the liquid discharge head unit 210 to follow the meandering of the web 120 are described further later.

The surface detecting unit 110F10 is preferably provided for each liquid discharge head unit 210. In the example structure illustrated in FIG. 2, there are four surface detecting units 110F10. The surface detecting unit 110F10 detects at least one of the position, speed of movement, and amount of movement of the web 120 in the conveyance direction 10. The surface detecting unit 110F10 is implemented by, for example, the following structure.

Hardware Configuration of Surface Detecting Unit

The surface sensor device is provided for each of the liquid discharge head unit 210. The surface sensor device is an example of hardware to implement the surface detecting unit 110F10 illustrated in FIG. 14. Preferably usable for the surface sensor device is an optical sensor OS employing laser or light such as infrared. The optical sensor OS is an example of a sensor to detect the surface of the recording medium such as the web 120. The sensor OS is example hardware to implement the function of an imaging unit to acquire an image representing surface data, of the surface detecting unit 110F10. In the description below, the sensor of the surface sensor device may be referred to as "surface sensor". Note that, the optical sensor OS can be, for example, a charge-coupled device (CCD) camera or a complementary metal oxide semiconductor (CMOS) camera. In the description below, the optical sensor OS is a CMOS image sensor. The surface detecting unit 110F10 can be preferably implemented by the hardware configuration described below.

FIG. 14 is a schematic block diagram illustrating a hardware configuration of the imaging unit according to the present embodiment. For example, the imaging unit is implemented by hardware such as the sensor devices SEN and the controller 520, illustrated in the drawing.

Figure 15:
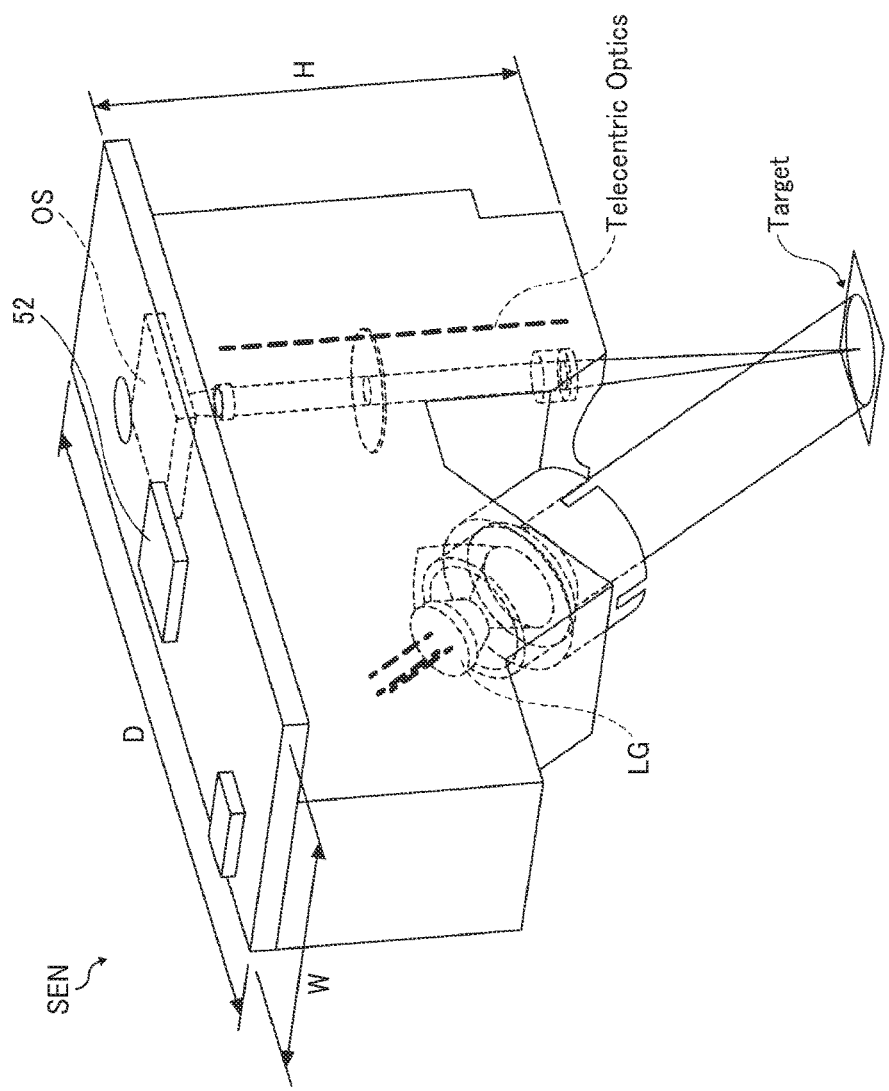
FIG. 15 is an external view of a surface sensor device according to an embodiment.

FIG. 15 is an external view of the sensor device SEN according to the present embodiment.

The sensor device SEN is configured to capture a speckle pattern, which appears on a conveyed object (i.e., a target in FIG. 15) such as the web 120 when the conveyed object is irradiated with light. The speckle pattern is an example of surface data of the web 120. Specifically, the sensor device SEN includes the light source LG such as a semiconductor laser light source (e.g., a laser diode or LD) and an optical system such as a collimate optical system. To obtain an image of the speckle pattern, the sensor device SEN includes the optical sensor OS (a CMOS image sensor) and a telecentric optics (TO) to condense light to image the speckle pattern on the optical sensor OS.

In the illustrated structure, the CMOS image sensors (the optical sensors OS) of different sensor devices SEN capture the image of the speckle pattern, for example, at a time TM1 and a time TM2, respectively. Based on the image obtained at the time TM1 and the image obtained at the time TM2, the controller 520 performs cross-correlation operation. In this case, the controller 520 calculates, for example, the amount by which the conveyed object has actually moved from the time TM1 to the TM2, from one sensor device SEN toward the other sensor device SEN. Details are to be described later. Alternatively, the same sensor device SEN can capture the speckle pattern at the time TM1 and at the time TM2, and the cross-correlation operation can be made using the image of the speckle pattern captured at the time TM1 and that captured at the time TM2. In this case, the controller 520 can output the amount of movement of the conveyed object from the time TM1 to the time TM2. In the illustrated example, the sensor device SEN is 15 mm in width, 60 mm in depth, and 32 mm in height (15×60×32). The light source is not limited to devices employing laser light but can be, for example, a light emitting diode (LED) or an organic electro luminescence (EL). Depending on the type of light source, the pattern indicating the surface data is not limited to the speckle pattern. Descriptions are given below of an example in which the pattern indicating the surface data is a speckle pattern. The CMOS image sensor (the optical sensor OS) is an example hardware structure to implement an imaging unit 16 (16A or 16B) to be described later. Although the controller 520 performs the correlation operation in this example, in one embodiment, a field-programmable gate array (FPGA) circuit of one of the sensor devices SEN performs the correlation operation. The control circuit 52 controls the optical sensor OS, the light source LG, and the like disposed inside the sensor device SEN. Specifically, the control circuit 52 is an example hardware to implement the function of the change unit 110F70. The control circuit 52 outputs trigger signals to the optical sensor OS to control the shutter timing of the optical sensor OS. The control circuit 52 causes the optical sensor OS to generate the two-dimensional images and acquires the two-dimensional images therefrom. Then, the control circuit 52 transmits the two-dimensional images generated by the optical sensor OS to a memory device 53.

The memory device 53 is a so-called memory. It is preferable that the two-dimensional image transmitted from the control circuit 52 can be divided and the memory device 53 can store the divided images in different memory ranges.

The controller 520 performs operations using the image data stored in the memory device 53. The control circuit 52 and the controller 520 are, for example, central processing units (CPUs) or electronic circuits. Note that the control circuit 52, the memory device 53, and the controller 520 are not necessarily different devices. For example, the control circuit 52 and the controller 520 can be implemented by a single CPU.

Example Functional Configuration Using Surface Detecting Unit

Figure 16:
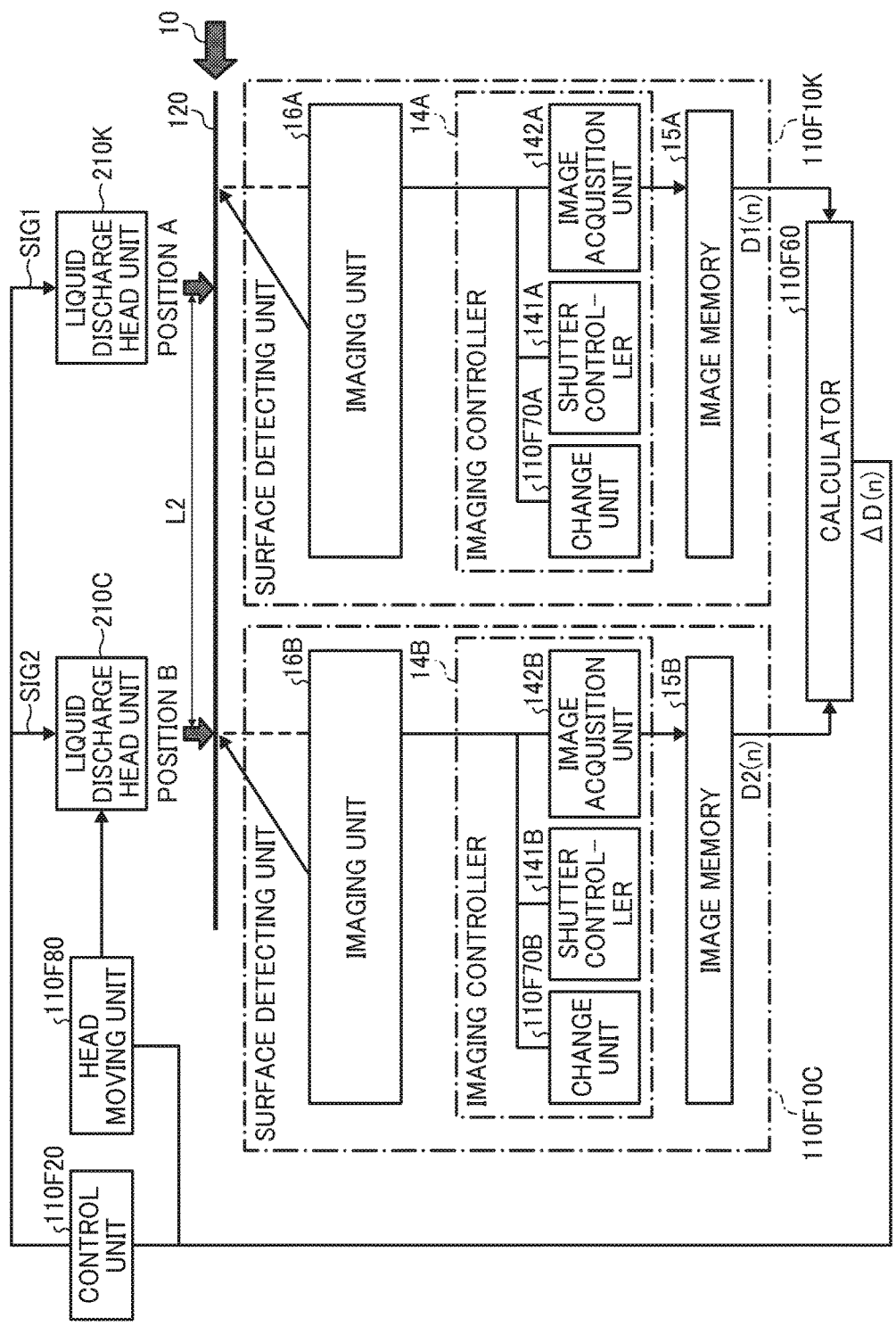
FIG. 16 is a schematic functional block diagram of a configuration incorporating the surface detecting unit according to an embodiment.

FIG. 16 is a schematic block diagram of a functional configuration incorporating the surface detecting unit according to an embodiment. Descriptions below are based on a combination of the surface detecting units 110F10 (the reference character "K" and "C" are added thereto in FIG. 16) for the liquid discharge head units 210K and 210C. In this example, the surface detecting unit 110F10K for the liquid discharge head unit 210K outputs a detection result concerning a position A, and the surface detecting unit 110F10C for the liquid discharge head unit 210C outputs a detection result concerning a position B. The surface detecting unit 110F10K for the liquid discharge head unit 210K includes, for example, an imaging unit 16A, an imaging controller 14A, an image memory 15A, and the change unit 110F70. In this example, the surface detecting unit 110F10C for the liquid discharge head unit 210C is similar in configuration to the surface detecting unit 110F10 and includes an imaging unit 16B, an imaging controller 14B, an image memory 15B, and a change unit 110F70B. The surface detecting unit 110F10K concerning the position A is described below.

The imaging unit 16A captures an image of the web 120 conveyed in the conveyance direction 10. The imaging unit 16A is implemented by, for example, the optical sensor OS (illustrated in FIG. 15).

The imaging controller 14A includes a shutter controller 141A, an image acquisition unit 142A, and the change unit 110F70. The imaging controller 14A is implemented by, for example, the control circuit 52 (illustrated in FIG. 14).

The image acquisition unit 142A captures the image generated by the imaging unit 16A.

The shutter controller 141A controls the timing of imaging by the imaging unit 16A. As described above, in the case where the adjusting unit 110F50 uses the head moving unit 110F80 to adjust the landing position of the liquid discharge head unit 210 in the orthogonal direction 20, the change unit 110F70 changes the origin of detection by the surface detecting unit 110F10 during image formation.

The image memory 15A stores the image acquired by the imaging controller 14A. The image memory 15A is implemented by, for example, the memory device 53 and the like (illustrated in FIG. 14).

The calculator 110F60 is configured to calculate, based on the images respectively recorded in the image memories 15A and 15B, the position of a pattern on the web 120, the speed at which the web 120 is conveyed (hereinafter "conveyance speed"), and the amount by which the web 120 is conveyed (hereinafter "conveyance amount").

The calculator 110F60 outputs, to the shutter controllers 141A and 141B, data on time difference Δt indicating the timing of shooting (shutter timing). In other words, the calculator 110F60 instructs the shutter controller 141A of shutter timings of imaging at the position A and imaging at the position B with the time difference Δt.

The calculator 110F60 is implemented by, for example, the controller 520.

The web 120 has diffusiveness on a surface thereof or in an interior thereof. Accordingly, when the web 120 is irradiated with light (e.g., laser beam), the reflected light is diffused. The diffuse reflection creates a pattern on the web 120. The pattern is made of spots called "speckles" (i.e., a speckle pattern). Accordingly, when the web 120 is shot, an image of the speckle pattern is obtained. From the image, the position of the speckle pattern is known, and the location of a specific portion of the web 120 can be detected. The speckle pattern is generated as the light emitted to the web 120 interferes with a rugged shape caused by a projection and a recess, on the surface or inside of the web 120.

As the web 120 is conveyed, the speckle pattern on the web 120 is conveyed as well. When an identical speckle pattern is detected at different time points, the amount of movement of the speckle pattern is obtained. In other words, the calculator 110F60 obtains the amount of movement of the speckle pattern based on the detection of an identical speckle pattern, thereby obtaining the amount of movement of the web 120. Further, the calculator 110F60 converts the calculated amount of movement into an amount of movement per unit time, thereby obtain the speed at which the web 120 has moved. The amount of movement and speed of movement of the web 120 obtained are not limited to those in the conveyance direction 10. Since the imaging unit 16A outputs two-dimensional image data, the calculator 110F60 can calculate the amount or speed of two-dimensional movement. The head moving unit 110F80 functions to move the liquid discharge head unit 210 based on the amount or speed of movement in the orthogonal direction 20 calculated by the calculator 110F60. The head moving unit 110F80 is implemented by, for example, the hardware configuration illustrated in FIG. 8.

A control unit 110F20 (serving as an image formation control unit, illustrated in FIG. 13) functions to control the timing of discharge of liquid from the liquid discharge head unit based on the detection result generated by the surface detecting unit 110F10. The control unit 110F20 is implemented by, for example, the hardware structure illustrated in FIG. 9. The control unit 110F20 controls the timing of discharge of the liquid discharge head unit 210 based on the displacement of amount of movement in the conveyance direction 10 or the displacement of speed of movement, calculated by the calculator 110F60.

The liquid discharge apparatus 110 can further include a measuring instrument such as an encoder 300 illustrated in FIG. 2. For example, the encoder 300 is attached to a rotation shaft of the roller 230, which is a driving roller. Then, the amount of movement of the web 120 can be measured based on the amount of rotation of the roller 230. When the measurement results are used in combination with the detection results generated by the surface sensor device, the liquid discharge apparatus 110 can discharge ink to the web 120 accurately.

For example, the calculator 110F60 performs the correlation operation as follows.

Example of Correlation Operation

Figure 17:
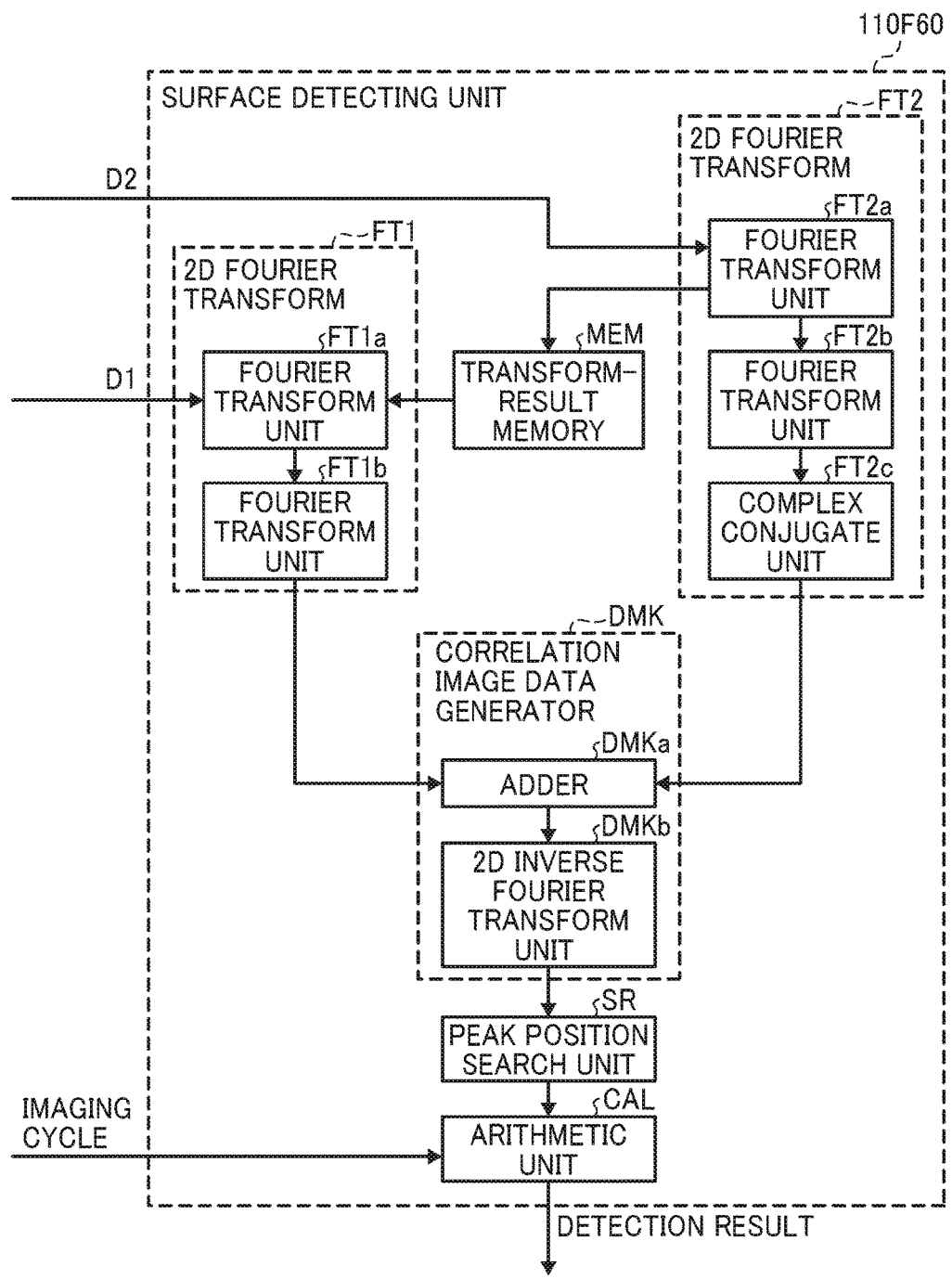
FIG. 17 is a diagram of a method of correlation operation according to an embodiment.

FIG. 17 is a diagram of a configuration for the correlation operation according to the present embodiment. For example, the calculator 110F60 performs the correlation operation with the illustrated configuration, to calculate the relative position of the web 120 in the orthogonal direction at the position where the image data is obtained, the amount of movement, speed of movement, or a combination thereof. With the correlation operation, the amount of displacement of the web 120 from the ideal position at the timing when the image data is obtained and the speed of movement can be calculated.

Specifically, the calculator 110F60 includes a 2D Fourier transform FT1 (a first 2D Fourier transform), a 2D Fourier transform FT2 (second 2D Fourier transform), a correlation image data generator DMK, a peak position search unit SR, an arithmetic unit CAL (or arithmetic logical unit), and a transform-result memory MEM.

The 2D Fourier transform FT1 is configured to transform the first image data D1. The 2D Fourier transform FT1 includes a Fourier transform unit FT1a for transform in the orthogonal direction 20 and a Fourier transform unit FT1b for transform in the conveyance direction 10.

The Fourier transform unit FT1a performs one-dimensional transform of the first image data D1 in the orthogonal direction 20. Based on the result of transform by the Fourier transform unit FT1a for orthogonal direction, the Fourier transform unit FT1b performs one-dimensional transform of the first image data D1 in the conveyance direction 10. Thus, the Fourier transform unit FT1a and the Fourier transform unit FT1b perform one-dimensional transform in the orthogonal direction 20 and the conveyance direction 10, respectively. The 2D Fourier transform FT1 outputs the result of transform to the correlation image data generator DMK.

Similarly, the 2D Fourier transform FT2 is configured to transform the second image data D2. The 2D Fourier transform FT2 includes a Fourier transform unit FT2a for transform in the orthogonal direction 20, a Fourier transform unit FT2b for transform in the conveyance direction 10, and a complex conjugate unit FT2c.

The Fourier transform unit FT2a performs one-dimensional transform of the second image data D2 in the orthogonal direction 20. Based on the result of transform by the Fourier transform unit FT2a for orthogonal direction, the Fourier transform unit FT2b performs one-dimensional transform of the second image data D2 in the conveyance direction 10. Thus, the Fourier transform unit FT2a and the Fourier transform unit FT2b perform one-dimensional transform in the orthogonal direction 20 and the conveyance direction 10, respectively.

Subsequently, the complex conjugate unit FT2c calculates a complex conjugate of the results of transform by the Fourier transform unit FT2a (for orthogonal direction) and the Fourier transform unit FT2b (for conveyance direction). Then, the 2D Fourier transform FT2 outputs, to the correlation image data generator DMK, the complex conjugate calculated by the complex conjugate unit FT2c.

The correlation image data generator DMK then generates the correlation image data, based on the transform result of the first image data D1, output from the 2D Fourier transform FT1, and the transform result of the second image data D2, output from the 2D Fourier transform FT2.

The correlation image data generator DMK includes an adder DMKa and a 2D inverse Fourier transform unit DMKb.

The adder DMKa adds the transform result of the first image data D1 to that of the second image data D2 and outputs the result of addition to the 2D inverse Fourier transform unit DMKb.

The 2D inverse Fourier transform unit DMKb performs 2D inverse Fourier transform of the result generated by the adder DMKa. Thus, the correlation image data is generated through 2D inverse Fourier transform. The 2D inverse Fourier transform unit DMKb outputs the correlation image data to the peak position search unit SR.

The peak position search unit SR searches the correlation image data for a peak position (a peak luminance or peak value), at which rising is sharpest. To the correlation image data, values indicating the intensity of light, that is, the degree of luminance, are input. The luminance values are input in matrix.

Note that, in the correlation image data, the luminance values are arranged at a pixel pitch of the optical sensor OS (i.e., an area sensor), that is, pixel size intervals. Accordingly, the peak position is preferably searched for after performing so-called sub-pixel processing. Sub-pixel processing enhances the accuracy in searching for the peak position. Then, the calculator 110F60 can output the position, the amount of movement, and the speed of movement.

An example of searching by the peak position search unit SR is described below.

Figure 18:
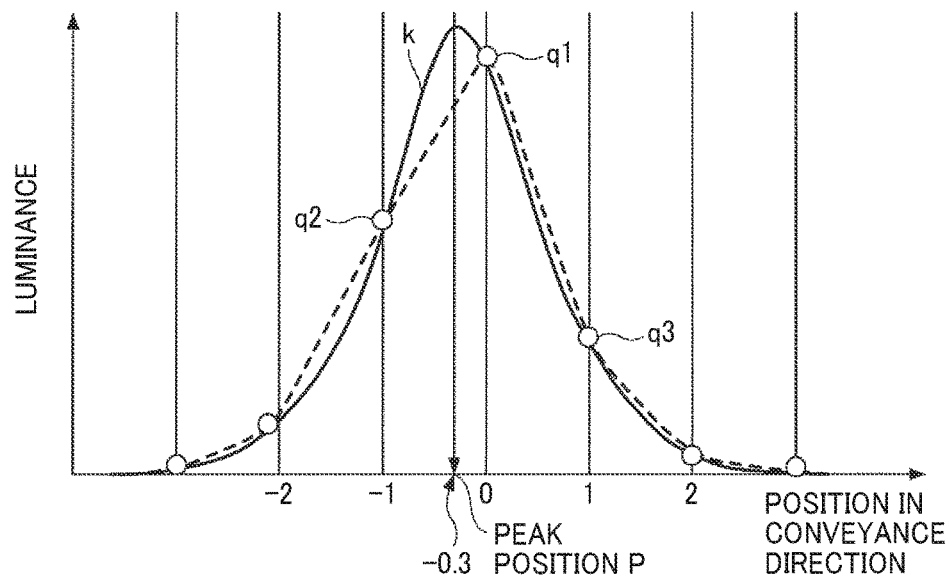
FIG. 18 is a graph for understanding of a peak position searched in the correlation operation illustrated in FIG. 17.

FIG. 18 is a graph illustrating the peak position searched in the correlation operation according to the present embodiment. In this graph, the lateral axis represents the position in the conveyance direction 10 of an image represented by the correlation image data, and the vertical axis represents the luminance values of the image represented by the correlation image data.

The luminance values indicated by the correlation image data are described below using a first data value q1, a second data value q2, and a third data value q3. In this example, the peak position search unit SR (illustrated in FIG. 17) searches for peak position P on a curved line k connecting the first, second, and third data values q1, q2, and q3.

Initially, the peak position search unit SR calculates each difference between the luminance values indicated by the correlation image data. Then, the peak position search unit SR extracts a largest difference combination, meaning a combination of luminance values between which the difference is largest among the calculated differences. Then, the peak position search unit SR extracts combinations of luminance values adjacent to the largest difference combination. Thus, the peak position search unit SR can extract three data values, such as the first, second, and third data values q1, q2, and q3 in the graph. The peak position search unit SR calculates the curved line K connecting these three data values, thereby obtaining the peak position P. In this manner, the peak position search unit SR can reduce the amount of operation such as sub-pixel processing to increase the speed of searching for the peak position P. The position of the combination of luminance values between which the difference is largest means the position at which rising is sharpest. The manner of sub-pixel processing is not limited to the description above.

Through the searching of the peak position P performed by the peak position search unit SR, for example, the following result is attained.

Figure 19:
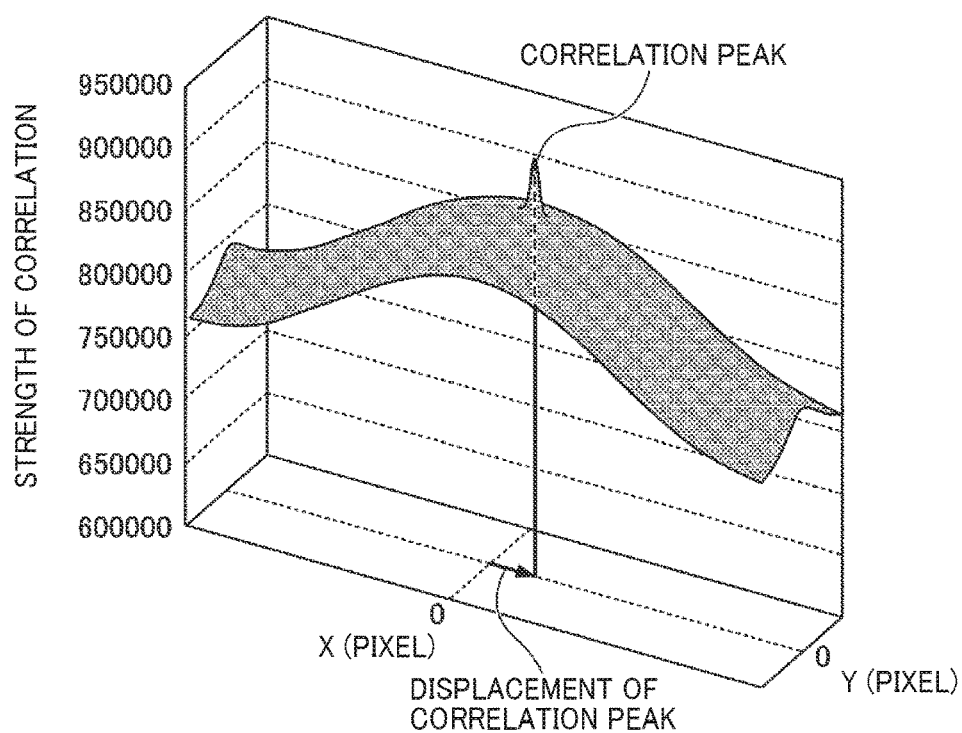
FIG. 19 is a diagram of example results of the correlation operation illustrated in FIG. 17.

FIG. 19 is a diagram of example results of correlation operation and illustrates a profile of strength of correlation of a correlation function. In the drawing, X axis and Y axis represent serial number of pixel. The peak position search unit SR (illustrated in FIG. 17) searches for a peak position such as "correlation peak" in the graph.

Referring back to FIG. 17, the arithmetic unit CAL calculates the relative position, amount of movement, or speed of movement of the web 120, or a combination thereof. For example, the arithmetic unit CAL calculates the difference between a center position of the correlation image data and the peak position calculated by the peak position search unit SR, to obtain the relative position and the amount of movement.

For example, the arithmetic unit CAL divides the amount of movement by time, to obtain the speed of movement.

Thus, the calculator 110F60 can calculate, through the correlation operation, the relative position at the position of the sensor, amount of movement, or speed of movement of the web 120. The methods of calculation of the relative position, the amount of movement, or the speed of movement are not limited to those described above. For example, alternatively, the calculator 110F60 obtains the relative position, amount of movement, or speed of movement through the following method.

Initially, the calculator 110F60 binarizes each luminance value of the first image data D1 and the second image data D2. That is, the calculator 110F60 binarizes a luminance value not greater than a predetermined threshold into "0" and a luminance value greater than the threshold into "1". Then, the calculator 110F60 may compare the binarized first and second image data D1 and D2 to obtain the relative position.

Although the description above concerns a case where fluctuations are present in Y direction, the peak position occurs at a position displaced in the X direction when there are fluctuations in the X direction.

Alternatively, the calculator 110F60 can adapt a different method to obtain the relative position, amount of movement, or speed of movement. For example, the calculator 110F60 can adapt so-called pattern matching processing to detect the relative position based on a pattern taken in the image data.

Then, based on the speckle pattern, the liquid discharge apparatus 110 can obtain a detection result indicating the position of the web 120 in at least one of the conveyance direction 10 and the orthogonal direction 20, with a high accuracy. The sensor device SEN can be shared for detecting respective positions in the conveyance direction 10 and the orthogonal direction 20, which reduces the cost of detecting positions in both directions. Additionally, the space for the detection can be small since the number of sensors is reduced.

Additionally, the above-described embodiment can be modified to detect the amount of displacement and perform the adjustment as described below.

Figure 20:
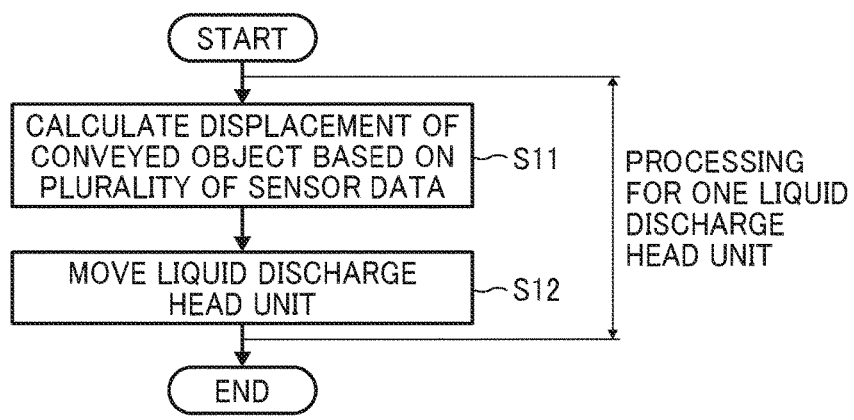
FIG. 20 is a flowchart of surface detection and position adjustment of a liquid discharge head unit during image formation, according to a variation.

FIG. 20 is a flowchart of surface detection and position adjustment of a liquid discharge head unit during image formation. The process illustrated in FIG. 20 is executed after the process illustrated in FIG. 12, that is, after 1) the position detecting unit 110F40 illustrated in FIG. 13 detects the operation position (liquid discharge position), 2) the head moving unit 110F80, instructed by the adjusting unit 110F50, adjusts the respective landing positions of the liquid discharge head units 210 in the orthogonal direction 20 to the adjusted positions, and 3) the change unit 110F70 changes the position of origin of detection of each of the surface detecting units 110F10. In other words, the liquid discharge head unit 210 is moved in the orthogonal direction 20 during image formation, with the adjusted position set by the head moving unit 110F80 instructed by the adjusting unit 110F50 used as the initial position. Then, the liquid discharge apparatus 110 forms an image on the web 120 according to the image data, while performing the processing illustrated in FIG. 20.

The processing illustrated in FIG. 20 relates to one liquid discharge head unit, for example, the liquid discharge head unit 210C in the example illustrated in FIG. 2. For the liquid discharge head unit 210 of another color, the processing illustrated in FIG. 20 is performed in parallel or at a different timing. For the purpose of making the liquid discharge head units 210 follow the meandering of the web 120 during image formation, performing the processing illustrated in FIG. 20 for different colors in parallel is preferred, but the processing is not necessarily completely simultaneous. What is desirable is moving respectively the liquid discharge head units 210 in the orthogonal direction 20 to follow the meandering web 120 during image formation.

At S11, the liquid discharge apparatus 110 calculates the position and the like of the conveyed object based on a plurality of sensor data. Specifically, at S11, the surface sensor devices detect the positions of the web 120. The liquid discharge apparatus 110 acquires the plurality of sensor data representing the respective detection results output by the surface sensor devices. Subsequently, the calculator 110F60 calculates the amount of displacement of the recording medium based on the plurality of sensor data, that is, a plurality of detection results.

At S12, the liquid discharge apparatus 110 moves the liquid discharge head unit 210 in the orthogonal direction 20 based on the detection result acquired at S11, to compensate for the displacement of the web 120 in the orthogonal direction 20, indicated by the detection result acquired at S11. That is, at S12, the liquid discharge head unit 210 is moved by the amount of displacement of the web 120 detected at S11, to cancel the displacement of the web 120. Thus, the liquid discharge head unit 210 can follow the meandering of the web 120 during image formation. Alternatively, the liquid discharge apparatus 110 can adjust the timing of discharge of the liquid.

The above-described processing can be explained with a timing chart described below.

Figure 21:
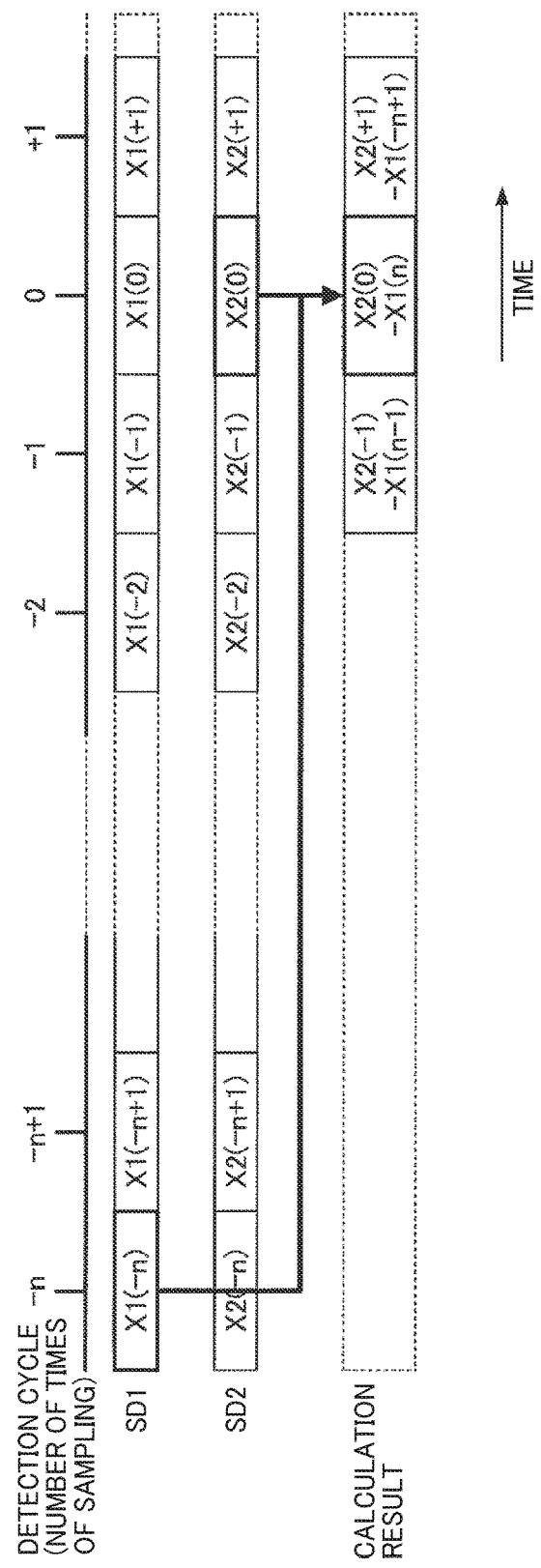
FIG. 21 is a timing chart of calculation of the amount of displacement of a conveyed object, according to an embodiment.

FIG. 21 is a timing chart of calculation of the amount of displacement of the conveyed object, performed by the liquid discharge apparatus 110 according to the present embodiment. As illustrated in the drawing, the liquid discharge apparatus 110 calculates the amount of movement or the like based on data generated by a plurality of sensor data. Specifically, the liquid discharge apparatus 110 outputs the result of calculation indicating the displacement based on first and second detection results SD1 and SD2. The first and second detection results SD1 and SD2 are represented by sensor data output from any two of the surface sensor devices illustrated in FIG. 2. Then, the liquid discharge apparatus 110 calculates the amount of displacement based on the plurality of detection results represented by the respective sensor data.

The amount of displacement is calculated for each liquid discharge head unit 210. Descriptions are given below of calculation of displacement of the web 120 for adjusting the cyan liquid discharge head unit 210C (illustrated in FIG. 2). In this example, the displacement of the web 120 is calculated based on the detection result generated by the sensor device SENC (illustrated in FIG. 2) and that by the sensor device SENK disposed upstream from and next to the sensor device SENC. In this drawing, the first detection result SD1 is generated by the sensor device SENK, and the second detection result SD2 is generated by the sensor device SENC.

It is assumed that L2 (see FIG. 16) represents the distance between the sensor device SENK and the sensor device SENC (interval between the surface sensor devices), V represents the conveyance speed calculated based on the data generated by the optical sensors OS, and T2 represents a travel time for the web 120 (conveyed object) to be conveyed from position detected by the sensor device SENK to the position detected by the sensor device SENC. In this case, the time T2 is calculated as "T2=L2/V".

Further, when A represents a sampling interval of the surface sensor devices and n represents the number of times of sampling performed while the web 120 travels from the sensor device SENK to the sensor device SENC, the number of times of sampling "n" is calculated as "n=T2/A".

The calculation result is referred to as a displacement ΔX. For example, in a case of a detection cycle "0" in FIG. 21, the first detection result SD1 before the travel time T2 is compared with the second detection result SD2 at the detection cycle "0", to calculate the displacement ΔX of the web 120. This calculation is expressed as ΔX=X2(0)−X1(n). In the arrangement in which the position of the surface sensor device is between the landing position and the first roller CR1, the liquid discharge apparatus 110 calculates the amount by which the position of the recording medium is expected to change till the recording medium reaches the location of surface sensor device. Then, the liquid discharge apparatus 110 drives the actuator ACT illustrated in FIG. 8.

Subsequently, the liquid discharge apparatus 110 controls the actuator ACT (illustrated in FIG. 8) to move the liquid discharge head unit 210C (illustrated in FIG. 8) in the orthogonal direction 20, to compensate for the displacement Δ. With this operation, even when the position of the conveyed object changes in the orthogonal direction 20, the liquid discharge apparatus 110 can form an image on the conveyed object with a high accuracy. Further, as the displacement is calculated based on the two detection results, that is, the detection results generated by the two different surface sensor devices, the displacement of the conveyed object can be calculated without multiplying the position data of the sensors. This operation can suppress the accumulation of detection errors by the surface sensor devices.

The amount of displacement can be calculated similarly for other liquid discharge head units 210. The first detection result SD1 generated by the sensor device SENC and the second detection result SD2 generated by the sensor device SENM are used to calculate the displacement of the web 120 for adjusting the magenta liquid discharge head unit 210M (illustrated in FIG. 2). The first detection result SD1 generated by the sensor device SENM and the second detection result SD2 generated by the sensor device SENY are used to calculate the displacement of the web 120 for adjusting the yellow liquid discharge head unit 210Y (illustrated in FIG. 2). Although not illustrated in FIG. 2, when the liquid discharge apparatus 110 further includes another sensor device SEN upstream from the sensor device SENK in the conveyance direction 10, the displacement of the web 120 for adjusting the liquid discharge head unit 210K can be calculated.

The surface sensor device (sensor device SEN) to generate the detection result SD1 is not limited to the sensor device SEN disposed next to and upstream from the liquid discharge head unit 210 to be moved. That is, the first detection result SD1 can be generated by any of the sensor devices SEN disposed upstream from the liquid discharge head unit 210 to be moved. The detection result generated by any one of the sensor devices SENK and SENC can be used as the first detection result SD1 to calculate the displacement of the web 120 for adjusting the yellow liquid discharge head unit 210Y.

By contrast, the second detection result SD2 is preferably generated by the sensor device SEN closest to the liquid discharge head unit 210 to be moved.

Alternatively, the displacement of the conveyed object can be calculated based on three or more detection results.

Based on the displacement of the web 120 thus calculated based on a plurality of detection results, the liquid discharge head units 210 are respectively moved, and the liquid is discharged onto the web 120 (i.e., the recording medium) to form an image thereon. The surface sensor device is preferably disposed close to the ink landing position.

That is, the distance between the ink landing position and the surface sensor device is preferably short. When the distance between the ink landing position and the surfaces sensor device is short, detection error can be suppressed. Accordingly, the liquid discharge apparatus 110 can accurately detect, with the surface sensor device, at least one of the position, speed of movement, and amount of movement of the recording medium in the conveyance direction 10 and the orthogonal direction 20.

Specifically, the position close to the landing position is an area between the first roller CR1 and the second roller CR2. In the illustrative embodiment, the sensor device SENK for black is preferably disposed in an inter-roller range INTK1 between the first and second rollers CR1K and CR2K. Similarly, the sensor device SENC for cyan is preferably disposed in an inter-roller range INTC1 between the first and second rollers CR1C and CR2C. The sensor device SENM for magenta is preferably disposed in an inter-roller range INTM1 between the first and second rollers CR1M and CR2M. The sensor device SENY for yellow is preferably disposed in an inter-roller range INTY1 between the first and second rollers CR1Y and CR2Y. The inter-roller ranges INTY1, INTC1, INTM1, and INTY1 are collectively referred to as "inter-roller ranges INT1". The surface sensor device disposed between the first and second rollers CR1 and CR2 can detect the recording medium at a position close to the ink landing position. The conveyance speed in the conveyance direction 10 and the speed of meandering (the speed of movement in the orthogonal direction 20) of the conveyed object is relatively stable between the rollers. Accordingly, the liquid discharge apparatus 110 can accurately detect the position, speed of movement, or amount of movement of the recording medium.

More preferably, in each inter-roller ranges INT1, the surface sensor device is disposed between the ink landing position and the first roller CR1. In other words, the surface sensor device is preferably disposed upstream from the ink landing position in the conveyance direction 10.

Specifically, the sensor device SENK for black is, more preferably, disposed in a range extending from the black ink landing position PK upstream to the first roller CR1K for black in the conveyance direction 10 (hereinafter "upstream range INTK2"). Similarly, the sensor device SENC for cyan is, more preferably, disposed in a range extending from the cyan ink landing position PC upstream to the first roller CR1C for cyan (hereinafter "upstream range INTC2"). The sensor device SENM for magenta is, more preferably, disposed in a range extending from the magenta ink landing position PM upstream to the first roller CR1M for magenta (hereinafter "upstream range INTM2"). The sensor device SENY for yellow is, more preferably, disposed in a range extending from the yellow ink landing position PY upstream to the first roller CR1Y for yellow (hereinafter "upstream range INTY2").

When the surface sensor devices are respectively disposed in the upstream ranges INTK2, INTC2, INTM2, and INTM2, the liquid discharge apparatus 110 can detect the position, speed of movement, or amount of movement of the conveyed object with a high accuracy. The surface sensor devices thus disposed are upstream from the landing position at which ink droplets land on the recording medium in the conveyance direction 10. Accordingly, the liquid discharge apparatus 110 can initially detect the position of the conveyed object with the surface sensor device based on the data output by the surface sensor device on the upstream side, and then calculate the position or speed of movement of the liquid discharge head unit 210 and timing of ink discharge (i.e., operation timing) of the liquid discharge head unit 210. In other words, as the web 120 is conveyed downstream during such calculation, the liquid discharge head unit 210 can discharge ink at the calculated position and the calculated timing.

Note that, if the surface sensor device is disposed directly below the liquid discharge head unit 210, in some cases, a delay of control action causes misalignment in color superimposition (out of color registration) resulting in color shift. Accordingly, when the location of surface sensor device is upstream from the ink landing position, misalignment in color superimposition is suppressed, improving image quality. There are cases where layout constraints hinder disposing the surface sensor device adjacent to the landing position. Accordingly, the surface sensor device is preferably disposed closer to the first roller CR1 from the ink landing position.

When such delay of control action does not matter and there is no layout constraint, the location of surface sensor device can be directly below the liquid discharge head unit 210. The surface sensor device disposed directly below the head unit can accurately detect the amount of movement of the recording medium directly below the head unit. Therefore, in a configuration in which the speed of calculation of movement amount or the like is relatively fast, the surface sensor device is preferably disposed closer to the position directly below the liquid discharge head unit 210. However, the location of surface sensor device is not limited to the position directly below the liquid discharge head unit 210, and similar calculation is feasible when the surface sensor device is disposed otherwise.

Note that, as illustrated in FIG. 2, the displacement sensor PSEN is disposed on the same side of the web 120 as the liquid discharge head units 210, so as to detect the image patterns PTN illustrated in FIG. 5.

By contrast, the sensor devices SEN are disposed on the side of the web 120 opposite the liquid discharge head units 210 and the displacement sensor PSEN. In other words, as illustrated in FIG. 2, the displacement sensor PSEN is disposed on the front side of the web 120 while the sensor devices SEN are disposed on the back side of the web 120. For the sensor device SEN, detection of a speckle pattern is easier on a side on which liquid discharge is not performed. However, the sensor device SEN can be disposed on the front side of the web 120 when the sensor device SEN can detect a position to which liquid is not discharged.

As described above, the liquid discharge apparatus 110 changes the operation position in the orthogonal direction 20 and the position of origin of the surface detecting unit 110F10 based on the detection by the position detecting unit 110F40 (the displacement sensor PSEN) during a period in which image formation is not performed. Then, the liquid discharge apparatus 110 can calculate the ink discharge timing (i.e., operation timing), the amount by which the liquid discharge head unit 210 is to be moved, or a combination thereof, based on the detection result generated by the surface detecting unit 110F10, during image formation.

Then, during image formation, in a period from when the position of the web 120 is detected on the upstream side to when the detected portion of the web 120 reaches the ink landing position, calculation of the liquid discharge timing, moving of the liquid discharge head unit 210, or the combination thereof can be performed. Accordingly, the liquid discharge head unit 210 can accurately change the landing position in at least one of the conveyance direction 10 and the orthogonal direction 20.

As described above, the liquid discharge apparatus 110 includes the position detecting unit 110F40 to calculate the amount of displacement of the web, for example, as illustrated in FIG. 6. The adjusting unit 110F50 moves the liquid discharge head unit 210 in the orthogonal direction 20, for example, as illustrated in FIG. 7.

When the conveyed object is conveyed askew as illustrated in FIG. 4, the conveyed object is displaced in the orthogonal direction 20, resulting in misalignment in color superimposition and degrading image quality. Accordingly, the liquid discharge head unit 210 is moved in the orthogonal direction 20 to eliminate the displacement. As the amount of displacement decreases, the accuracy of the landing position of liquid can improve. Further, in accordance with the position adjustment of the liquid discharge head unit 210, the origin of detection by the surface detecting unit 110F10 is changed. During image formation, at least one of the position, speed of movement, and amount of movement of the web 120 is detected based on the detection result generated by the surface detecting unit 110F10, using the position of the liquid discharge head unit 210 moved according to an instruction from the adjusting unit 110F50 as the initial position. Then, the liquid discharge head unit 210 is moved to follow the meandering of the web 120. With the improved accuracy of landing position, the liquid discharge apparatus 110 can minimize the misalignment in color superimposition to improve image quality.

[Variation]

One sensor device can double as the surface sensor and the displacement sensor (i.e., used as a dual-purpose sensor). Descriptions are given below of a variation in which the dual-purpose sensor is disposed outside an image formation area. For example, the dual-purpose sensor is disposed at an end of the web 120 in the orthogonal direction 20. In this variation, the dual-purpose sensor is disposed on a side of the web 120 on which the liquid discharge head units 210 are disposed.

In this variation, the image patterns PTN (PTN1, PTN2, and PTN3) illustrated in FIG. 5 are formed, for example, in an end portion of the web 120. In this variation, the liquid discharge apparatus 110 can further include a light source for detecting the image pattern PTN different from the light source used to detect the pattern of the web 120 (e.g., speckle pattern). The liquid discharge apparatus 110 can further have a capability to adjust the amount of light emitted from the light source for detecting the image pattern PTN. Specifically, in the case of the dual-purpose sensor, when the procedure illustrated in FIG. 12 is performed, a sensor located downstream from at least two liquid discharge head units 210 serves as the displacement sensor. When the procedure illustrated in FIG. 20 is performed, the sensor provided for (disposed close to) the liquid discharge head unit 210 to be moved in image formation serves as the surface sensor.

Using one sensor as both of the surface sensor and the displacement sensor can reduce the number of sensors and reduce the cost of the apparatus.

One or more of aspects of this disclosure can adapt to a liquid discharge system including at least one liquid discharge apparatus. For example, the liquid discharge head unit 210K and the liquid discharge head unit 210C are housed in a case of one apparatus, and the liquid discharge head unit 210M and the liquid discharge head unit 210Y are housed in a case of another apparatus. Then, the liquid discharge system includes the two apparatuses.

Further, one or more of aspects of this disclosure can adapt to a liquid discharge system to discharge liquid other than ink. For example, the liquid is a recording liquid of another type or a fixing solution. In other words, aspects of this disclosure can adapt to a liquid discharge apparatus to discharge liquid other than ink and a system including such a liquid discharge apparatus.

The image formed by the liquid discharge apparatus (or system) to which at least one aspect of this disclosure can be thick or rugged (with a projection and a recess). The image (an article) produced can be, for example, a three-dimensional object (a 3D-fabricated object).

Note that, a single support can double as the first and second supports as described below.

Figure 22:
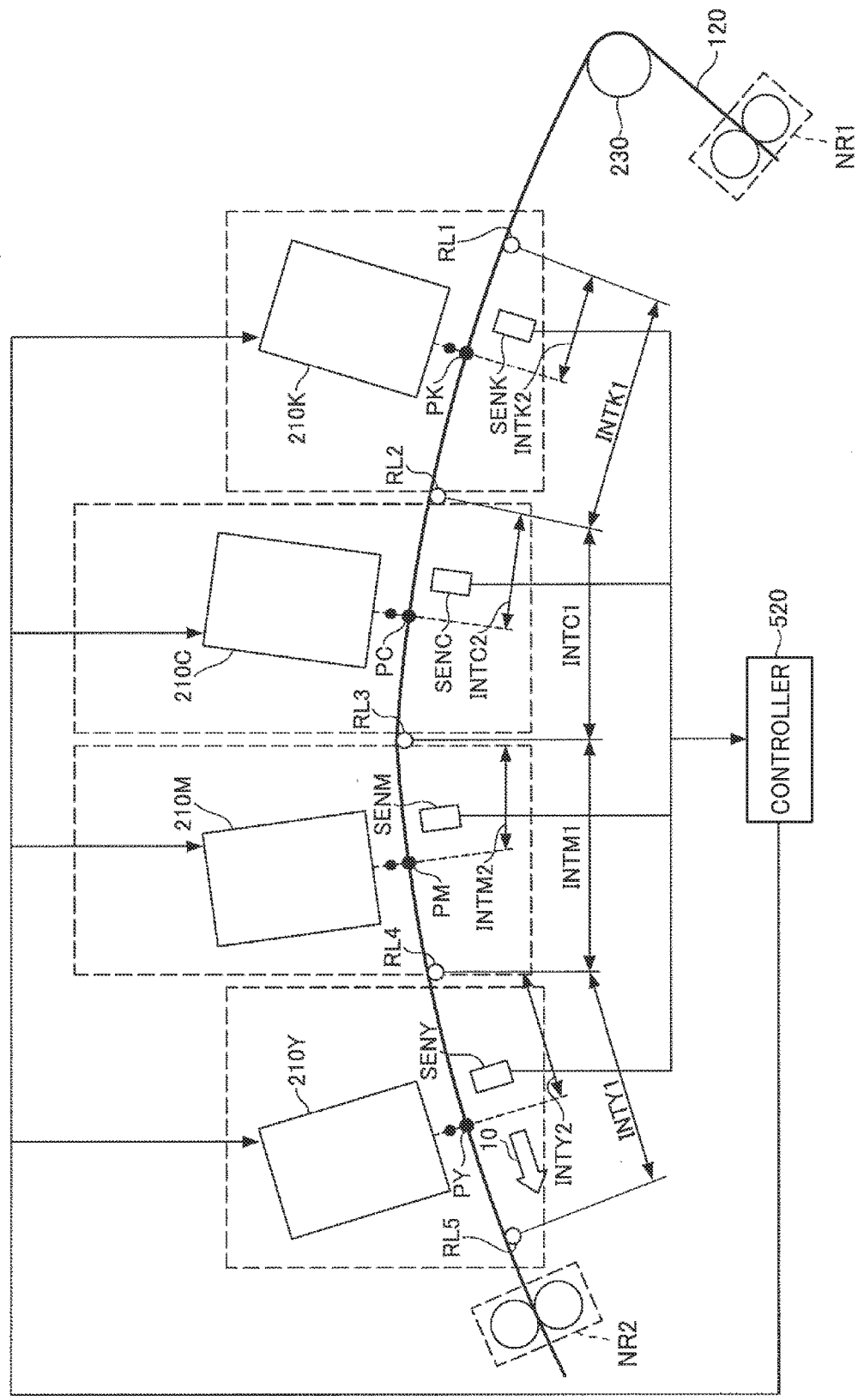
FIG. 22 is a schematic view of a liquid discharge apparatus according to a variation.

FIG. 22 is a schematic view of a liquid discharge apparatus according to a variation. This configuration differs from the configuration illustrated in FIG. 2 regarding the locations of the first support and the second support. The liquid discharge apparatus 110 illustrated in FIG. 22 includes supports RL1, RL2, RL3, RL4, and RL5, serving as the first and second supports. In other words, one support can double as the second support (e.g., the conveyance roller CR2K in FIG. 2) disposed upstream from the downstream one of adjacent two liquid discharge head units and the first support (e.g., the conveyance roller CR1C in FIG. 2) disposed upstream from the upstream one of the adjacent two liquid discharge head units. Note that, the support according to the modification, which doubles as the first and second supports, can be either a roller or a curved plate.

The conveyed object is not limited to recording media such as paper sheets but can be any material to which liquid adheres, even temporarily. Examples of the material to which liquid adheres include paper, thread, fiber, cloth, leather, metal, plastic, glass, wood, ceramics, and a combination thereof. The liquid discharge apparatus 110 can convey a belt as the conveyed object.

Figure 23:
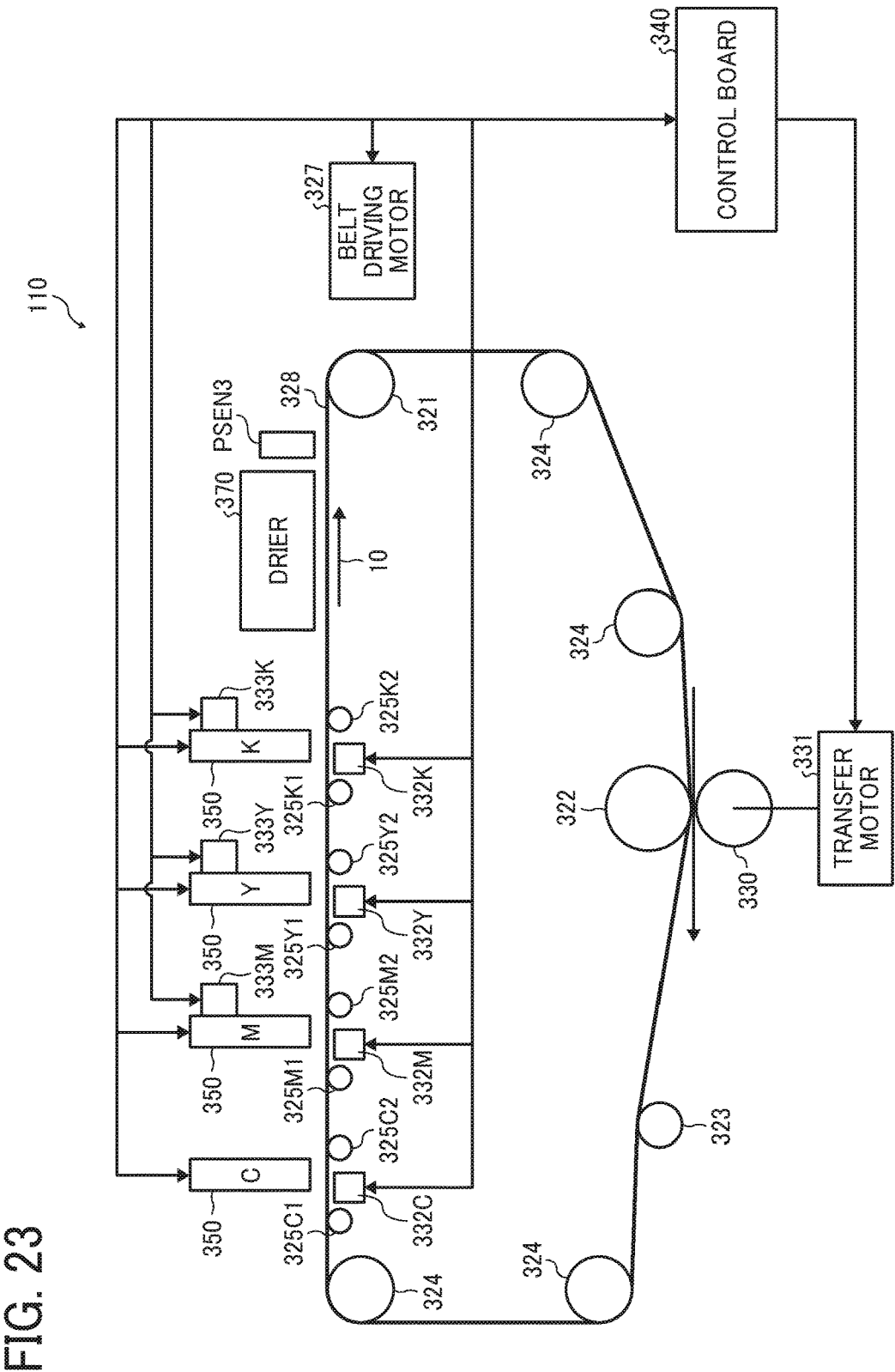
FIG. 23 is a schematic view of a liquid discharge apparatus according to another variation.

FIG. 23 is a schematic view of a liquid discharge apparatus according to another variation. In this example, head units 350C, 350M, 350Y, and 350K discharge ink droplets to form an image on the outer side of the loop of a transfer belt 328. The head units 350C, 350M, 350Y, and 350K are also collectively referred to as head units 350.

A drier 370 dries an image formed on the transfer belt 328 into a film.

Then, at a transfer position where the transfer belt 328 faces a transfer roller 330, the liquid discharge apparatus 110 transfers the image in the form of film, conveyed on the transfer belt 328, onto a sheet.

Additionally, a cleaning roller 323 cleans the surface of the transfer belt 328 after the transfer.

In the liquid discharge apparatus 110 illustrated in FIG. 23, the head units 350C, 350M, 350Y, and 350K, the drier 370, the cleaning roller 323, and the transfer roller 330 are disposed around the transfer belt 328.

In this example, the transfer belt 328 is stretched taut around a driving roller 321, an opposing roller 322 (a transfer-backup roller), four shape-keeping rollers 324, and eight support rollers 325C1, 325C2, 325M1, 325M2, 325Y1, 325Y2, 325K1, and 325K2. As the driving roller 321 rotates driven by a belt driving motor 327, the transfer belt 328 rotates in the conveyance direction 10 indicated an arrow illustrated in FIG. 23.

The eight support rollers 325C1, 325C2, 325M1, 325M2, 325Y1, 325Y2, 325K1, and 325K2, disposed opposite the head units 350, keep the transfer belt 328 taut when the head units 350C, 350M, 350Y, and 350K discharge ink droplets. A transfer motor 331 drives the transfer roller 330.

Further, a sensor device 332C is disposed between the support rollers 325C1 and 325C2 and upstream from the ink discharge position of the head unit 350C in the conveyance direction 10 in which the transfer belt 328 rotates.

Similar to the position of the sensor device 332C relative to the support rollers 325C1 and 325C2 and the head unit 350C, the sensor device 332M is disposed for the head unit 350M.

Further, in this variation, a displacement sensor PSEN3 is disposed downstream from the drier 370 in the conveyance direction 10. Alternatively, the displacement sensor PSEN3 can be disposed upstream from the drier 370.

For the head units 350M, 350Y, and 350K, actuators 333M, 333Y, and 333K are provided, respectively. The actuator 333M moves the head unit 350M in the direction orthogonal to the conveyance direction 10 in which the transfer belt 328 rotates. Similarly, the actuators 333Y and 333K move the head units 350Y and 350K, respectively, in the direction orthogonal to the conveyance direction 10.

A control board 340 moves (with the actuators 333M, 333Y, and 333K) the head units 350M, 350Y, and 350K based on the data obtained from the displacement sensor PSEN3, before image formation. Additionally, the control board 340 detects the amount of movement of the transfer belt 328 in the conveyance direction 10 and that in the direction orthogonal thereto, based on the image data obtained from the sensor devices 332C, 332M, 332Y, and 332K. Additionally, according to the amount of movement of the transfer belt 328 in the orthogonal direction, the control board 340 controls the actuators 333M, 333Y, and 333K to move the head units 350M, 350Y, and 350K in the orthogonal direction. Additionally, according to the amount of movement of the transfer belt 328 in the conveyance direction 10, the control board 340 controls the timing of liquid discharge from the head units 350M, 350Y, and 350K.

The control board 340 outputs driving signals to the belt driving motor 327 and the transfer motor 331.

When the transfer belt 328 moves in the direction orthogonal to the direction in which the transfer belt 328 is driven by the driving roller 321 during driving of the transfer belt 328, the liquid discharge apparatus 110 can move the head units 350M, 350Y, and 350K in the orthogonal direction, corresponding to the amount of movement detected. Accordingly, the liquid discharge apparatus 110 can form a high-quality image on the transfer belt 328.

When the amount by which the transfer belt 328 rotates in the direction driven by the driving roller 321 is different from a supposed amount, the liquid discharge apparatus 110 can change the timing of liquid discharge from the head units 350M, 350Y, and 350K in response to the amount of rotation detected. Accordingly, the liquid discharge apparatus 110 can form a high-quality image on the transfer belt 328.

In the above-described example, the amount of movement of the transfer belt 328 in the conveyance direction 10 and that in the direction orthogonal thereto are calculated based on the image data obtained from the sensor devices 332C, 332M, 332Y, and 332K. Alternatively, the amount of movement in only one of those directions can be calculated.

Although the head unit 350C does not include an actuator in the above-described example, alternatively, an actuator can be provided. Then, the head unit 350C is moved in the direction orthogonal to the conveyance direction 10, thereby adjusting the position of the head unit 350C in the orthogonal direction at the time of image transfer from the transfer belt 328 onto the sheet P.

Although a plurality of head units is used to form an image on the transfer belt 328 in the example described above, alternatively, the operation described above can adopt to forming an image using one head unit.

Further, aspects of this disclosure can adapt to any apparatus to perform an operation or processing on a conveyed object, using a line head unit including heads lined in a direction orthogonal to the direction of conveyance of the conveyed object.

For example, aspects of this disclosure can adapt to an apparatus that conveys a substrate (conveyed object) and includes a laser head unit to perform laser patterning, as image formation, on the substrate. A plurality of such laser head units can be lined in the direction orthogonal to the direction of conveyance of the substrate. The apparatus detects the result of laser writing to adjust the position of the head unit and then detects the position of the substrate to move the head unit based on the result of detection of the substrate. In this case, the position on the substrate irradiated with laser light is the operation position of the head. In this example, patterning is an example of image formation.

The number of the head units is not necessarily two or more. Aspects of this disclosure can adapt to a device configured to keep performing processing at a reference position, on a conveyed object.

Further, one or more of aspects of this disclosure can be embodied as a method performed by a computer of a conveyance device, an information processing system including at least one information processing apparatus, or the combination thereof to cause the apparatus to discharge liquid, and at least a portion of the method can be implemented by a program.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. An image forming apparatus comprising:
   a conveyor to convey a conveyed object in a conveyance direction;
   a plurality of head units to perform image formation on the conveyed object;
   a displacement sensor disposed downstream from the plurality of head units to detect a position adjustment image, formed by the plurality of head units, on the conveyed object;
   at least one processor configured to adjust an image formation position of at least one of the plurality of head units in an orthogonal direction to the conveyance direction based on a detection result generated by the displacement sensor;
   a surface sensor to obtain surface data of the conveyed object at a position corresponding to the at least one of the plurality of head units; and
   a sensor moving device,
   the at least one processor configured to adjust the adjusted image formation position in the orthogonal direction based on the surface data obtained by the surface sensor, to change an origin of image data captured by the surface sensor, and to move, with the sensor moving device, the surface sensor to change the origin of image data.

2. The image forming apparatus according to claim 1, wherein the at least one processor is configured to change a coordinate of the origin of image data output from the surface sensor.

3. The image forming apparatus according to claim 1, wherein the at least one processor is configured to calculate a detection result including at least one of a position, a speed of movement, and an amount of movement of the conveyed object based on the surface data output from the surface sensor.

4. The image forming apparatus according to claim 3, wherein the surface data represents a pattern of the conveyed object, and wherein the at least one processor is configured to calculate the detection result with reference to the pattern.

5. The image forming apparatus according to claim 4, wherein the pattern is generated by interference of light reflected on a rugged shape of the conveyed object.

6. The image forming apparatus according to claim 3, wherein the at least one processor is configured to determine timing of image formation by each of the plurality of head units based on the detection result.

7. The image forming apparatus according to claim 1, further comprising:
   a first support disposed upstream from the image formation position of the at least one of the plurality of head units in the conveyance direction; and
   a second support disposed downstream from the image formation position in the conveyance direction,
   wherein the surface sensor is disposed between the first support and the second support.

8. The image forming apparatus according to claim 7, wherein the surface sensor is disposed between the image formation position and the first support in the conveyance direction.

9. The image forming apparatus according claim 1, wherein the surface sensor is an optical sensor.

10. The image forming apparatus according to claim 1, wherein the conveyed object is a continuous sheet extending in the conveyance direction.

11. The image forming apparatus according to claim 1, further comprising an actuator to move the at least one of the plurality of head units in the orthogonal direction, to adjust the image formation position.

12. The image forming apparatus according to claim 1, wherein the plurality of head units is a plurality of liquid discharge head units, each of which includes a plurality of liquid discharge nozzles arranged in the orthogonal direction, and
   wherein the at least one processor is configured to change a nozzle to discharge liquid, to adjust the image formation position in the orthogonal direction.

13. An image forming system comprising:
   a plurality of image forming apparatuses each including:
      a conveyor to convey a conveyed object in a conveyance direction;
      a plurality of head units to perform image formation on the conveyed object;
      a displacement sensor disposed downstream from the plurality of head units to detect a position adjustment image, formed by the plurality of head units, on the conveyed object;
      at least one processor configured to adjust an image formation position of the at least one of the plurality of head units in an orthogonal direction to the conveyance direction based on a detection result generated by the displacement sensor;
      a surface sensor to obtain surface data of the conveyed object at a position corresponding to the at least one of the plurality of head units; and
   a sensor moving device,
      the at least one processor configured to further adjust the adjusted image formation position in the orthogonal direction based on the surface data obtained by the surface sensor, to change an origin of image data captured by the surface sensor, and to move, with the sensor moving device, the surface sensor to change the origin of image data.

14. A method for adjusting a position of image formation on a conveyed object in an apparatus including a plurality of head units, the method comprising:
   forming a position adjustment image on the conveyed object with the plurality of head units;
   detecting the position adjustment image at a position downstream from the plurality of head units;
   adjusting an image formation position of at least one of the plurality of head units in an orthogonal direction to a conveyance direction in which the conveyed object is conveyed, based on a result of detection of the position adjustment image;
   obtaining, with a surface sensor, surface data of the conveyed object at a position corresponding to the at least one of the plurality of head units;
   the adjusted image formation position in the orthogonal direction based on the surface data obtained;
   changing an origin of image data captured by the surface sensor; and
   moving, with a sensor moving device, the surface sensor to change the origin of image data.

* * * * *